United States Patent [19]
Carus

[11] Patent Number: 5,890,103
[45] Date of Patent: Mar. 30, 1999

[54] METHOD AND APPARATUS FOR IMPROVED TOKENIZATION OF NATURAL LANGUAGE TEXT

[75] Inventor: Alwin B. Carus, Newton, Mass.

[73] Assignee: Lernout & Hauspie Speech Products N.V., Ypres, Belgium

[21] Appl. No.: 684,002

[22] Filed: Jul. 19, 1996

Related U.S. Application Data

[63] Continuation-in-part of Ser. No. 503,981, Jul. 1, 1995, Pat. No. 5,680,628, and a continuation-in-part of Ser. No. 555,495, Nov. 8, 1995, Pat. No. 5,794,177.

[51] Int. Cl.⁶ .................................................. G06F 17/27
[52] U.S. Cl. .................................. 704/9; 704/8; 707/531; 707/536
[58] Field of Search .................................. 704/8, 9, 1, 10; 707/531, 532, 536, 1, 2, 4, 5

[56] References Cited

U.S. PATENT DOCUMENTS

| | | | |
|---|---|---|---|
| 4,724,523 | 2/1988 | Kucera | 707/532 |
| 4,730,270 | 3/1988 | Okajima et al. | 704/2 |
| 4,771,401 | 9/1988 | Kaufman et al. | 707/533 |
| 4,862,408 | 8/1989 | Zamora | 707/102 |
| 4,864,501 | 9/1989 | Kucera et al. | 704/8 |
| 4,864,502 | 9/1989 | Kucera et al. | 704/8 |
| 4,868,750 | 9/1989 | Kucera et al. | 704/8 |
| 4,914,590 | 4/1990 | Loatman et al. | 704/8 |
| 4,964,044 | 10/1990 | Kumano et al. | 704/6 |
| 4,991,094 | 2/1991 | Fagan et al. | 704/9 |
| 5,111,398 | 5/1992 | Nunberg et al. | 704/9 |
| 5,224,038 | 6/1993 | Bespalko | 707/531 |
| 5,229,936 | 7/1993 | Decker et al. | 704/10 |
| 5,243,520 | 9/1993 | Jacobs et al. | 704/9 |
| 5,251,129 | 10/1993 | Jacobs et al. | 704/9 |
| 5,278,980 | 1/1994 | Pedersen et al. | 707/4 |
| 5,282,265 | 1/1994 | Rohra Suda et al. | 706/11 |
| 5,331,556 | 7/1994 | Black, Jr. et al. | 704/9 |
| 5,383,120 | 1/1995 | Zernik | 704/10 |
| 5,423,032 | 6/1995 | Byrd et al. | 707/5 |
| 5,475,588 | 12/1995 | Schabes et al. | 704/9 |
| 5,523,946 | 6/1996 | Kaplan et al. | 704/2 |
| 5,642,522 | 6/1997 | Zaenen et al. | 707/532 |
| 5,680,628 | 10/1997 | Carus et al. | 704/1 |
| 5,704,060 | 12/1997 | Del Monte | 707/104 |
| 5,708,825 | 1/1998 | Sotomayor | 707/501 |

FOREIGN PATENT DOCUMENTS

| | | |
|---|---|---|
| 0282721A3 | 9/1988 | European Pat. Off. . |
| 0316743A3 | 5/1989 | European Pat. Off. . |
| 0327266A2 | 8/1989 | European Pat. Off. . |
| 0394633A2 | 10/1990 | European Pat. Off. . |
| 0 583 083 A2 | 7/1993 | European Pat. Off. . |
| 0562334A2 | 9/1993 | European Pat. Off. . |

OTHER PUBLICATIONS

Brill, Eric, "A Simple Rule–Based Part of Speech Tagger", *Third Conf. Applied Natural Lang. Processing, Proceedings of the Conference* (1992).

Frakes, W. and Baeza–Yates, R. (eds), *Information Retrieval Data Structures and Algorithms*, PTR Prentice–Hall, Inc.,ch. 7, 102–130 (1992).

Frakes, W. and Baeza–Yates, R. (eds), *Information Retrieval Data structures and Algorithms*, PTR Prentice–Hall, Inc., ch. 8, 131–151 (1992).

Schwarz, C., "Automatic Syntactic Analysis of Free Text", *J. Am. Soc. Info. Sci.* 41(6):408–417 (1990).

*Primary Examiner*—Joseph Thomas
*Attorney, Agent, or Firm*—Bromberg & Sunstein LLP

[57] ABSTRACT

This invention improves information retrieval by providing a tokenizing apparatus and method that parses natural language text in a manner that increases the throughput of an information retrieval or natural language analysis system. The tokenizer includes a parser that extracts characters from the stream of text, an identifying element for identifying a token formed of characters in the stream of text that include lexical matter, and a filter for assigning tags to those tokens requiring further linguistic analysis. The tokenizer, in a single pass through the stream of text, determines the further linguistic processing suitable to each particular token contained in the stream of text.

50 Claims, 24 Drawing Sheets

FIG. 3

| | FIELD DESCRIPTION | 32-BYTE PREFIX POSITION | LOW VALUE | HIGH VALUE | #BITS | BYTE POS | MASK | EN | FR | NR | FS | PT | IG | TR | GS | RW | DU |
|---|---|---|---|---|---|---|---|---|---|---|---|---|---|---|---|---|---|
| 32 | CAPCODE | 9 | 0 | 5 | 3 | 0 | 0x07 | X | X | X | X | X | X | X | X | X | X |
| 34 | DIALECT | 3 | | | 4 | 0 | 0xF0 | X | X | X | X | X | X | X | X | X | X |
| 36 | HAS MANDATORY HYPHEN | 30 | | | 1 | 1 | 0x80 | X | | | X | X | X | | X | X | X |
| 38 | IS DERIVATION | 4 | | | 1 | 1 | 0x40 | X | X | X | X | X | X | X | X | X | X |
| 40 | RESTRICTED/WORD FREQUENCY | 10-11 | | | 4 | 1 | 0x0F | X | X | X | X | X | X | X | X | X | X |
| 42 | RESERVED | | | | 2 | 1 | 0x30 | | | | | | | | | | |
| 44 | POS COMBINATION INDEX | 16-18 | | | 10 | 2<br>3 | 0xC0<br>0xFF | X | X | X | X | X | X | X | X | X | X |
| 46 | NOUN INFLECTION PATTERN | 21-23 | | | 10 | 2<br>4 | 0x30<br>0xFF | X | | | X | X | X | | X | X | X |
| 48 | VERB INFLECTION PATTERN | 24-26 | | | 10 | 2<br>5 | 0x0C<br>0xFF | X | | | X | X | X | | X | X | X |
| 50 | ADJ/ADV INFLECTION PATTERN | 27-29 | | | 10 | 2<br>6 | 0x03<br>0xFF | X | | | X | X | X | | X | X | X |
| 52 | DERIVATION PATTERN | 5-8 | | | 12 | 7<br>8 | 0xFF<br>0xF0 | X | X | X | X | X | X | X | X | X | X |
| 54 | COMPOUND INFO | 15 | | | 4 | 8 | 0x0F | | | | | | | X | X | X | X |
| 56 | ERROR POSITION | n/a | | | 5 | 9 | 0xF8 | X | X | X | X | X | X | X | X | X | X |
| 58 | LMCC LINK LENGTH | 14 | | | 3 | 9 | 0x07 | | | | | | | X | X | X | X |
| 60 | FIELD OF INTEREST | | | | 6 | 10 | 0x3F | X | X | X | X | X | X | X | X | X | X |
| | RESERVED | | | | 2 | 10 | 0xC0 | X | X | X | X | X | X | X | X | X | X |

WORD DATA TABLE 31: EXP N₁, EXP N₂, ..., EXP Nₘ (EXP N₂ → points to row 44)

/-62

| 64 | 66 | 68 |
|---|---|---|
| INDEX | POS TAG(S) | OEM TAG(S) |
| 1 | NN | N |
| 2 | NN$ | N |
| 3 | NNS$ | N |
| ... | | |
| 343 | ABN_NN_QL_RB | N_O_R |
| 344 | ABN_NN_NNS_QL_RB | N_O_R |
| 345 | ABN | O |
| 346 | ; | O |
| 347 | : | O |
| 348 | , | O |

| 72 | 74 |
|---|---|
| SUFFIX | POS INDEX |
| &bs | 004 |
| 'am | 001 |
| ... | |
| ôle | 001 |

FIG. 4B

| 73 | 75 | 77 | 79 |
|---|---|---|---|
| 001 | VB_->d_VBN | VB_->s_VBZ | VB_e->ing_VBG |
| 002 | VB_->ed_VBN | VB_->ing_VBG | VB_->s_VBZ |
| 003 | VB_->ed_VBN | VB_->es_VBZ | VB_->ing_VBG |
| 004 | VB_->ing_VBG | VB_y->ied_VBN | VB_y->ies_VBZ |
| 005 | VB_->ped_VBN | VB_->ping_VBG | VB_->s_VBZ |
| 006 | VB_->led_VBN | VB_->ling_VBG | VB_->s_VBZ |
| 007 | VB_->s_VBZ | VB_->ted_VBN | VB_->ting_VBG |
| 008 | VB_->ged_VBN | VB_->ging_VBG | VB_->s_VBZ |
| 009 | VB_->d_VBN | VB_->ing_VBG | VB_->s_VBZ |
| ... | | | |
| 132 | BE_->en_BEN | BE_->ing_BEG | |
| | BE_be->are_BER | BE_be->is_BEZ | BE_be->am_BEM |
| | BE_be->were_BED | | BE_be->was_BEDZ |
| 133 | 006002 | | |
| 134 | 060003 | | |
| 135 | 003002 | | |
| 136 | 009004 | | |
| 137 | 035003 | | |
| ... | | | |

| RULE | [i-2] | [i-1] | [i] | [i+1] |
|---|---|---|---|---|
| 1 | | | IF BEGINNING OF SENTENCE & CAPCODE>000 & PART-OF-SPEECH TAG= NOUN, THEN COERCE PRIMARY PART-OF-SPEECH TAG TO SINGULAR COMMON NOUN 268 | |
| 2 | PRIMARY PART-OF-SPEECH TAG= ARTICLE 270 | | IF PRIMARY PART-OF-SPEECH TAG=VERB OR SECOND POSSESSIVE PRONOUN OR EXCLAMATION OR VERB PAST TENSE FORM & SECONDARY PART-OF-SPEECH TAG=SINGULAR COMMON NOUN, THEN PROMOTE SECONDARY PART-OF-SPEECH TAG 272 | |
| 3 | | PART-OF-SPEECH TAG=VERB INFINITIVE OR SINGULAR COMMON NOUN 274 | IF PRIMARY PART-OF-SPEECH TAG=VERB OR SECOND POSSESSIVE PRONOUN OR EXCLAMATION OR VERB PAST TENSE FORM & SE-CONDARY PART-OF-SPEECH TAG=SINGULAR COMMON NOUN, THEN PROMOTE SECONDARY PART-OF-SPEECH TAG 276 | |
| 4 | | PART-OF-SPEECH TAG=MODAL AUXILIARY OR SINGULAR COMMON NOUN 278 | IF PRIMARY PART-OF-SPEECH TAG=MODAL AUXILIARY & SECONDARY PART-OF-SPEECH TAG=SINGULAR COMMON NOUN, THEN PROMOTE SECONDARY PART-OF-SPEECH TAG 280 | PART-OF-SPEECH TAG= INFINITIVE 282 |
| 5 | | PART-OF-SPEECH TAG=VERB INFINITIVE OR SINGULAR COMMON NOUN 284 | IF PRIMARY PART-OF-SPEECH TAG=VERB & SECONDARY PART-OF-SPEECH TAG= ADJECTIVE, THEN PROMOTE SECOND-ARY PART-OF-SPEECH TAG 286 | |
| 6 | | PART-OF-SPEECH TAG=VERB INFINITIVE OR SINGULAR COMMON NOUN 287 | IF PRIMARY PART-OF-SPEECH TAG=VERB & SECONDARY PART-OF-SPEECH TAG =COMPARATIVE ADJECTIVE, THEN PROMOTE SECONDARY 288 PART-OFSPEECH TAG | |

FIG. 9

IF AGREEMENT CHECKS TWO TOKENS T1 AND T2:

REDUCE POS1...POSn ON T1 TO NOUN PHRASE TAGS (CN, JJ*, MN, MN*, ON)
    IF ANY OF THE REMAINING TAGS IS MARKED AS 'MATCHED'
        REDUCE THE SET TO ONLY 'MATCHED' TAGS

REDUCE POS1...POSn ON T2 TO AGREEMENT TAGS (CN, JJ*,MM,NN*,ON)
    IF ANY OF THE REMAINING TAGS IS MARKED AS 'MATCHED'
        REDUCE THE SET TO ONLY 'MATCHED' TAGS

FOR EVERY POSi ON T1
        FOR EVERY POSj ON T2
            IF EITHER POSi OR POSj IS A CN, MM, OR ON
                MARK POSi AND POSj AS 'MATCHED'
            ELSE IF LANGUAGE IS FR/IT/SP:
                IF THE INTERSECTION OF NUMBER ON POSi AND POSj IS NOT EMPTY AND
                      THE INTERSECTION OF GENDER ON POSi AND POSj IS NOT EMPTY,
                      MARK POSi AND POSj AS 'MATCHED'
            ELSE IF LANGUAGE IS GR:
                IF THE INTERSECTION OF NUMBER ON POSi AND POSj IS NOT EMPTY AND
                      THE INTERSECTION OF GENDER ON POSi AND POSj IS NOT EMPTY,
                      THE INSECTION OF CASE ON POSi AND POSj IS NOT EMPTY,
                      MARK POSi AND POSj AS 'MATCHED'

IF AT LEAST ON POSi ON T2 IS MARKED AS MATCHED, T1 AND T2 AGREE
    ELSE T1 AND T2 DON'T AGREE.

FIG. 10

IF TRUNCATION SWITCH IS TURNED ON:

IF NP CONSISTS OF 2 ELEMENTS ONLY:  (1)
      RETURN IT

ELSE IF LANGUAGE IS EN/GR:  (2)
      RETURN LAST TWO ELEMENTS OF NP

ELSE IF LANGUAGE IS FR/IT/SP:
      IF NP CONTAINS SEQUENCE 'NN* + de + NN*':
         RETURN 'NN* + de + NN*'

ELSE

FIND THE FIRST TOKEN IN THE NP WHICH  (3)
         HAS POS NN*

IF THIS NN* IS FOLLOWED BY ANOTHER TOKEN:  (4)
            RETURN THE NN* PLUS THE FOLLOWING TOKEN

ELSE RETURN THE NN* PLUS THE PRECEDING
            TOKEN

FIG. 11

```
1   FOR EACH GRAMMATICAL FIELD TYPE SELECTED FROM NOUN, VERB, OR ADVERB/ADJECTIVE
2       IF THERE ISN'T A MORPHOLOGICAL PARADIGM OF THAT TYPE FOR THE WORD
3           CONTINUE
4       END IF
5       IF THE RULE IS PORTMANTEAU RULE
6           LET LIST BE LIST OF MORPHOLOGICAL PARADIGMS FROM THE PORTMANTEAU RULE
7       ELSE
8           LET LIST BE THIS MORPHOLOGICAL PARADIGM
9       END IF
10      FOR EACH MORPHOLOGICAL PARADIGM IN LIST
11          *FOR EACH POS TAG IN THE POS COMBO ENTRY
12              &IF THE POS TAG IS NOT FOUND WITHIN THE MORPHOLOGICAL PARADIGM FOR THIS
                    GRAMMATICAL FIELD
13              &THEN
14                  &CONTINUE
15              &END IF
16              IF THE POS TAG MATCHES THE BASE POS, THEN
17                  MARK THE WORD AS A BASEFORM
18                  SET THE POS BIT ACCORDING TO THE GRAMMATICAL FIELD TYPE
19                  IF DERIVING
20                      CALL DERIVATION MODULE
21                  END IF
22                  IF INFLECTING
23                      CALL INFLECTION MODULE WITH THIS PARADIGM
24                  END IF
25                  CONTINUE
26              END IF
```

FIG. 13A

```
27  FOR EACH MORPHOLOGICAL TRANSFORM IN THE PARADIGM
28      IF THE POS TAG MATCHES A MORPHOLOGICAL TRANSFORM POS TAG AND THE
        MORPHOLOGICAL PATTERN OF THE
29      MORPHOLOGICAL TRANSFORM MATCHES A CHARACTER STRING IN THE CANDIDATE
        WORD
30      THEN
31          APPLY THE MORPHOLOGICAL TRANSFORM TO PRODUCE THE BASEFORM
32          IF THE MORPHOLOGOCAL TRANSFORM HAS THE PREFIX FLAG SET
33              LOOK UP THE PREFIX IN THE INFLECTION PREFIX TABLE
34              APPLY THE PREFIX TRANSFORMATION TO THE WORD
35          END
36          SET THE POS BIT ACCORDING TO THE PATTERN TYPE
37          IF THE BASEFORM IS A DUPLICATE
38              REMOVE IT
39          ELSE
40          IF THE INFLECTION DOESN'T VERIFY
41              REMOVE IT
42          ELSE
43              IF DERIVING
44                  CALL THE DERIVATION MODULE
45              END IF
46              IF INFLECTING
47                  CALL THE INFLECTION MODULE
48              END IF
49          END IF
50      END IF
51  END FOR
52  END FOR
53  END FOR
54  END FOR
```

FIG. 13B

METHOD AND APPARATUS FOR IMPROVED TOKENIZATION OF NATURAL LANGUAGE TEXT

RELATED APPLICATION

This application is a continuation-in-part of the commonly-owned U.S. patent application Ser. No. 08/503,981, filed on Jul. 1, 1995 now U.S. Pat. No. 5,680,628 and is a continuation-in-part of the commonly-owned U.S. patent application, Ser. No. 08/,555,495 filed on Nov. 8, 1995, now U.S. Pat. No. 5,794,177.

BACKGROUND OF THE INVENTION

The present invention relates to automated language analysis systems, and relates to such systems embodied in the computer for receiving digitally encoded text composed in a natural language. In particular, it relates to systems for tokenizing and analyzing lexical matter found in a stream of natural language text. The invention can be used, for example, to provide text processing on word processors and microprocessor-controlled typewriters.

Automated language analysis systems embedded in a computer typically include a lexicon module and a processing module. The lexicon module is a "dictionary" or database containing words and semantic knowledge related to each word. The processing module includes a plurality of analysis modules which operate upon the input text and the lexicon module in order to process the text and generate a computer understandable semantic representation of the natural language text. Automated natural language analysis systems designed in this manner provide for an efficient language analyzer capable of achieving great benefits in performing tasks such as information retrieval.

Typically the processing of natural language text begins with the processing module fetching a continuous stream of electronic text from the input buffer. The processing module then decomposes the stream of natural language text into individual words, sentences, and messages. For instance, individual words can be identified by joining together a string of adjacent character codes between two consecutive occurrences of a white space code (i.e. a space, tab, or carriage return). These individual words identified by the processor are actually just "tokens" that may be found as entries in the lexicon module. This first stage of processing by the processing module is referred to as tokenization and the processor module at this stage is referred to as a tokenizer.

Following the tokenization phase, the entire incoming stream of natural language text may be subjected to further higher level linguistic processing. For instance, the entire incoming stream of text might be parsed into sentences having the subject, the main verb, the direct and indirect objects>(if any) prepositional phrases, relative clauses, adverbials, etc., identified for each sentence in the stream of incoming natural language text.

Tokenizers currently used in the art encounter problems regarding selective storage and processing of information found in the stream of text. In particular, prior art tokenizers store and process all white space delimited characters (i.e. "tokens") found in the stream of text. But it is not desirable, from an information processing standpoint, to process and store numbers, hyphens, and other forms of punctuation that are characterized as "tokens" by the prior art tokenizers. Rather, it is preferable to design a tokenizer that identifies as tokens only those character strings forming words that are relevant to information processing.

Prior art tokenizers have the additional drawback that each token extracted from the stream of text must be processed by each higher level linguistic processor in the automated language analysis system. For instance, each token must be processed by a noun phrase analysis module to determine whether the token is part of a noun phrase. This system results in an extensive amount of unnecessary higher level linguistic processing on inappropriate tokens.

Clearly, there is a need in the art for a tokenizer capable of more advanced processing that reduces the overall amount of data being processed by higher level linguistic processors and increases the overall system throughput.

Accordingly, an object of the invention is to provide an improved tokenizer that identifies a selected group of tokens appropriate for higher level linguistic processing.

Other general and specific objects of the invention will be apparent and evident from the accompanying drawings and the following description.

SUMMARY OF THE INVENTION

The invention attains the foregoing and other objects with an automated language analysis system that operates under a new paradigm for identifying relative information in a stream of natural language text. In particular, the automated language analysis system includes a tokenizer that views the incoming stream of natural language texts as consisting of alternating lexical and non-lexical matter. Lexical matter is broadly defined as information that can be found in a lexicon or dictionary, and that is relevant for information retrieval processes. The tokenizer of the invention does not view the incoming stream of text as merely containing words separated by white space.

This new tokenization paradigm allows the invention to associate the attributes of lexical matter found in a token and the attributes of non-lexical matter following the token with the token. The combined attributes of the lexical and non-lexical matter associated with any particular token are referred to as the parameters of the particular token. These parameters of the tokens forming the stream of natural language text are processed by the language analysis system, thereby providing for increased efficiency, throughput, and accuracy in the language analysis system.

The objects of the invention are further achieved based upon the discovery that linguistic information is encoded at many different levels in the natural language stream of text. The invention accordingly provides for a tokenizer that filters the tokens during the tokenization process and uses the filtered information to guide and constrain further linguistic analysis. For instance, the tokenizer filters the tokens to select those tokens that require, or are candidates for, higher level linguistic processing. Thus, the tokenizer advantageously selects a group of tokens for a particular higher level linguistic processing, rather than subjecting all tokens to the particular higher level linguistic processing, as commonly found in the prior art.

In one embodiment, the invention is a computerized tokenizer that comprises a parsing element for extracting lexical and non-lexical characters from the stream of digitized text, an identifying element for identifying a set of tokens, and a filter element for selecting a candidate token from the set of tokens. The tokenizer operates such that the filter selects out those candidate tokens suitable for additional linguistic processing from the stream of natural language text.

The filter element found in the tokenizer can include a character analyzer for selecting a candidate token from various tokens found in the stream of text. The character analyzer operates by comparing a selected character in the stream of text with entries in a character table, and by associating a first tag with a first token located proximal to the selected character, when the selected character has an equivalent entry in the character table. Under an alternative approach, the filter element found in the tokenizer includes a contextual processor for selecting a candidate token from various tokens found in the stream of text. The contextual processor selects the candidate token as a function of the lexical and nonlexical characters surrounding a character in the stream of text.

Both the character analyzer and the contextual analyzer operate effectively under many languages. For instance, the character analyzer and the contextual analyzer operate in English, French, Catalan, Spanish, Italian, Portuguese, German, Danish, Norwegian, Swedish, Dutch, Finish, Russian, and Czech. The rules governing the character analyzer and the contextual analyzer are extremely accurate across many languages and accordingly are language independent.

A particularly advantageous feature of the tokenizer is its ability to achieve filtering operations during a single scan of the stream of text. The tokenizer achieves this performance based in part upon the lexical paradigm adopted in this invention, and in part due to the language sensitivity in the design of the tokenizer. In particular, the rules and structure governing the tokenizer provide sufficient information to determine the appropriate additional linguistic processing without requiring additional scans through the stream of text.

Other aspects of the tokenizer provide for an associative processing element that associates a tag with the selected candidate token. The associated tag is used to identify additional linguistic processes applicable to the selected candidate token. The applicable processes can be stored in a memory element that is located using the tag. Additionally, the tokenizer can include an additional processing element that associates a plurality of tags with a plurality of selected candidate tokens, each of the plurality of tags identifying additional linguistic processing suitable for the respective candidate tokens. Typically, the plurality of tags is formed as a function of a selected candidate token. For example, based upon a particular character in the stream of text, a token including the particular character and the surrounding tokens could be identified as potential candidate for additional noun phrase analysis.

An additional feature of the tokenizer is the inclusion of a processor that modifies the candidate token. The candidate token may be modified based upon the tag or based upon the additional linguistic processing associated with the candidate token through the tag. This modifying processor can include processing modules that either: split tokens, strip tokens of particular characters, ignore characters in the token or surround non-lexical matter, or merge tokens in the stream of text.

According to a further aspect of the invention, the tokenizer stores and retrieves data from a memory element that is either associated with the tokenizer within the confines of the larger linguistic analysis system or that is a functional sub-element within the tokenizer itself. The data stored and retrieved by the tokenizer can include digital signals representative of the stream of natural language text and digital signals representative of the parameters of each token.

Token parameters stored in the memory element by the tokenizer can include: flags identifying the number of lexical characters and non-lexical characters forming a token; flags identifying the location of an output signal generated by said tokenizer; flags identifying the number of lexical characters forming a token; and flags identifying the lexical and non-lexical attributes of a token. The lexical attributes can include internal character attributes of the token, special processing for the token, end of sentence attributes of the token, and noun phrase attributes of the token. The non-lexical attributes can include white space attributes, single new line attributes, and multiple new line attributes. These token parameters and attributes advantageously aid in identifying additional linguistic processing suitable to a selected candidate token.

The invention further comprises a method for tokenizing natural language text in order to achieve higher throughput, efficiency, and accuracy. In particular, the tokenizing method includes the steps of extracting lexical and non-lexical characters from the stream of text, identifying a set of tokens, and selecting a candidate token from the set of tokens. The method operates such that the candidate token selected is suitable for additional linguistic processing.

The candidate token can be selected in accordance with the invention by comparing a selected character in the parsed stream of text with entries in a character table. When a selected character in the text matches an entry in the character table, a first tag identifying additional linguistic processing is associated with the token located proximal to the selected character in the text. Alternatively, the candidate token can be selected based upon a contextual analysis. For instance, the lexical and non-lexical characters surrounding a selected character in the stream of text to determine whether a token located proximal to the selected character is suitable for additional linguistic processing.

Further in accordance with the invention, the tokenizing method can further include associating a tag with those selected candidate tokens suited for additional linguistic processing. The tag typically identifies the additional linguistic processing suited for the selected candidate token. In addition, a plurality of tags can be associated with a plurality of tokens as a function of a candidate token being selected for additional linguistic processing.

Under another aspect of the invention, the tokenizing method comprises the step of modifying a selected candidate token. The selected candidate token is modified based upon the additional linguistic processing determined as suitable for the candidate token and identified by the tag associated with the selected candidate token. Additional features of the invention include a modifying step that either splits the candidate token into multiple tokens, strips a character from the candidate token, ignores a non-lexical character surrounding the candidate token, or merges the candidate token with another token.

The invention provides a system which enables people to enhance the quality of their writing and to use information more effectively. The novel tokenizer disclosed herein is a powerful software tool that hardware and software manufacturers can integrate into applications to help end-users find and retrieve information quickly and easily in multiple languages.

The invention achieves this by providing a linguistically intelligent approach to index pre-processing, search pre-processing, and search expansion. For example, the inventive tokenizer disclosed herein increases the throughput of the overall natural language processing system by filtering the tokens prior to higher-level linguistic analysis. The tokenizer manages to achieve this increased throughput across multiple languages and during a single pass through the incoming stream of text.

BRIEF DESCRIPTION OF THE DRAWINGS

FIG. 3 shows a word data table utilized by the processor of FIG. 1;

FIG. 4A illustrates a part-of-speech combination table referenced by the word data table of FIG. 3;

FIG. 4B illustrates a suffix table for referencing entries in the part-of-speech combination table of FIG. 4A;

FIG. 4C illustrates a morphological pattern file referenced by the word data table of FIG. 3;

FIG. 9 is a representative table of rules for the disambiguator shown in FIG. 6;

FIG. 10 illustrates pseudocode for the agreement checker of FIG. 6;

FIG. 11 contains pseudocode for the noun-phrase truncator of FIG. 6;

FIG. 13 contains pseudocode for the morphological analyzer of FIG. 1;

DETAILED DESCRIPTION OF THE DRAWINGS

Figure 1:
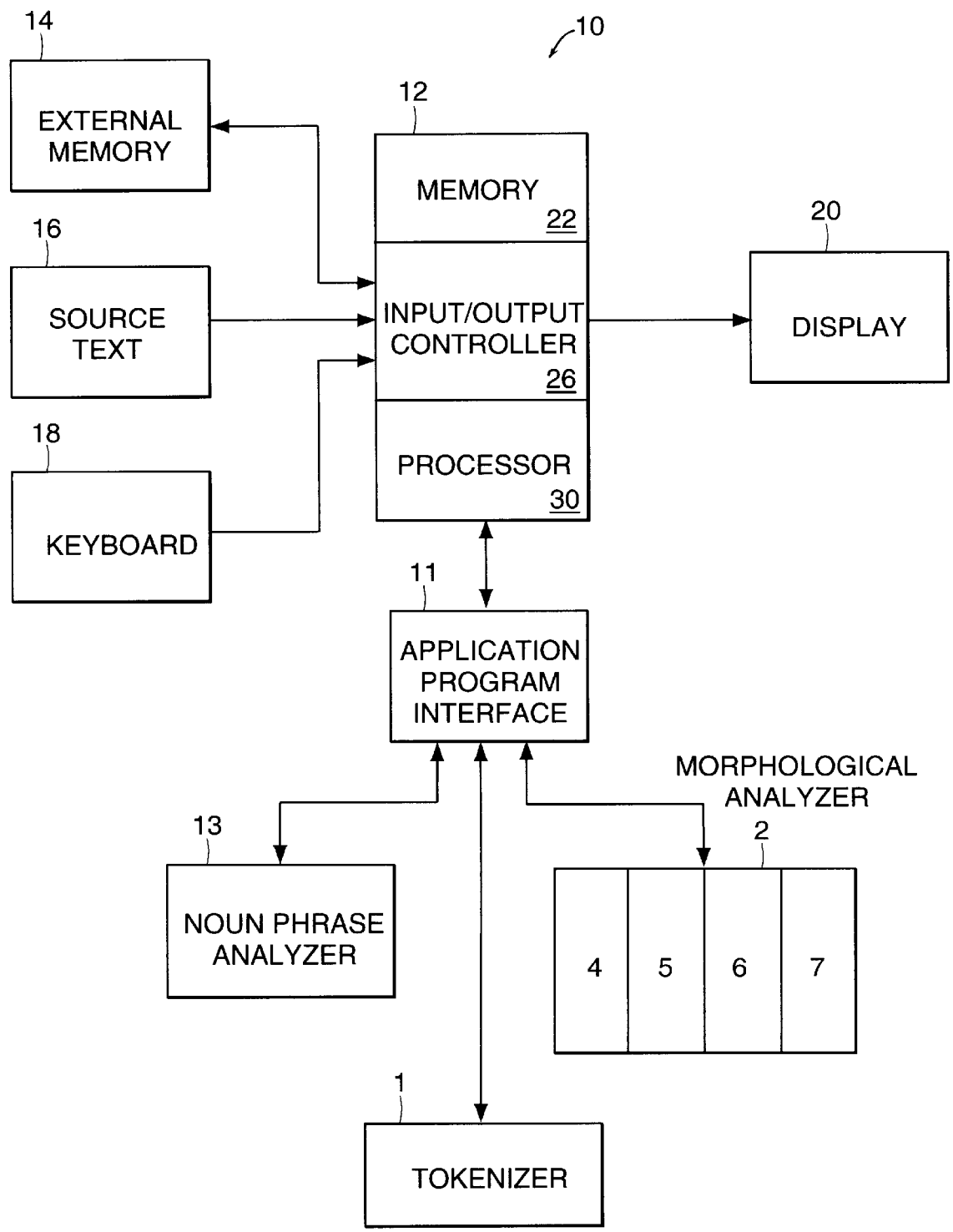
FIG. 1 is a block diagram of a programmable multilingual text processor according to the present invention.

FIG. 1 illustrates a multilingual text processor 10 in accordance with the invention. The text processor 10 includes a digital computer 12, an external memory 14, a source of text 16, a keyboard 18, a display 20, an application program interface 11, a tokenizer 1, a morphological analyzer/generator 2, and a noun-phrase analyzer 13. Digital computer 12 includes a memory element 22, an input/output controller 26, and a programmable processor 30.

Many of the elements of the multilingual text processor 10 can be selected from any of numerous commercially available devices. For example, digital computer 12 can be a UNIQ 486/33 MHz personal computer; external memory 14 can be a high speed non-volatile storage device, such as a SCSI hard drive; integral memory 22 can be 16MB of RAM; keyboard 18 can be a standard computer keyboard; and display 20 can be a video monitor. In operation, keyboard 18 and display 20 provide structural elements for interfacing with a user of the multilingual text processor 10. In particular, keyboard 18 inputs user typed commands and display 20 outputs for viewing signal generated by the text processor 10.

The External memory 14 is coupled with the digital computer 12, preferably through the Input/Output Controller 26. Data stored in the External Memory 14 can be downloaded to memory element 22, and data stored in the memory 22 can be correspondingly uploaded to the external memory 14. The external memory 14 can contain various tables utilized by the digital computer 12 to analyze a noun phrase or to perform morphological analysis.

The source of text 16 can be another application program, a keyboard, a communications link, or a data storage device. In either case, the source of text generates and outputs to the digital computer 12 a stream of natural language text. Alternatively, the digital computer 12 may receive as an input from the source of text 16 sentences of encoded text with sentence boundary markers inserted. Sentence splitting per se is known in the art, and is disclosed in Kucera et al., U.S. Pat. No. 4,773,009, entitled Method and Apparatus for Text Analysis. Preferably, the stream of natural language text with identified sentence boundaries enters the digital computer 12 at the Input/Output controller 26.

The Input/Output controller 26 organizes and controls the flow of data between the digital computer 12 and external accessories, such as external memory 14, keyboard 18, display 20, and the source of text 16. Input/Output controllers are known in the art, and frequently are an integral part of standard digital computers sold in the market today.

Application Program Interface 11 includes a set of closely related finctions, data types, and operations used in interfacing the computer 12 with the noun-phrase analyzer 13 and with the morphological analyzer/generator 2. In particular, the application program interface 11 comprises four functional elements: App Block, Database Block, Word Block, and Buffer Block. The App Block initiates an application instance, assigns an identification number to it, and passes user processing options to the Noun-phrase Analyzer 13, the morphological analyzer/generator 2, and the tokenizer 1. The Database Block initializes a database that provides linguistic information about a language. Word Block performs operations on individual words obtained from source text 16, and Buffer Block performs operations on an entire buffer of text obtained from source text 16. Each of the functional elements, i.e., App, Database, Word, and Buffer, contained in interface 11 have associated data structures used to pass information to the noun-phrase analyzer 13, the morphological analyzer/generator 2, and the tokenizer 1, before processing. The functional elements, i.e., App, Database, Word, and Buffer, contained in interface 11 also include data structures to return information from the Application Program Interface 11 after processing by the tokenizer 1, the morphological analyzer 2, and the noun phrase analyzer 13.

The four main functional elements contained in interface 11 perform operations on data structures formed by the application program interface 11. Memory for these functional elements and their associated databases is supplied by the digital computer 12 through the utilization of memory in internal memory element 22 and in external memory element 14.

In operation, App Block is the first functional block called. App Block initiates a session in the noun-phrase analyzer 13, the morphological analyzer/generator 2, or the tokenizer 1, and assigns a number to the session that uniquely identifies the session. The identifying number is used to track the allocated memory and execution status and to automatically free the memory once the session ends. App Block can start a session to process a single word or an entire buffer of text. In particular, App Block preferably processes one word at a time when the morphological analyzer/ generator 2 is called and App Block preferably processes an entire buffer of text when noun-phrase analyzer 13 or the tokenizer 1 is called.

Next, Database block is accessed in order to initialize a language database. The language databases provide linguistic information for processing text in a particular language and are used by the noun-phrase analyzer 13 and the morphological analyzer/generator 2. Multiple languages can be processed during any particular session if multiple calls to the database block are made during the session.

After initializing a session by calling App Block and initializing a database by calling Database block, either Word Block or Buffer Block is called, depending on whether a larger amount of text is being processed or one word at a time is being handled. The digital computer 12 fills an input buffer in the application program interface 11 with data from the source text 16, and then calls either Word Block or Buffer Block to begin processing of the text by analyzer 13, morphological analyzer/generator 2, or tokenizer 1. Following the call, noun-phrase analyzer, the morphological analyzer, or the tokenizer scans the input buffer, and creates a stream of tokens in the output buffer and an array that correlates the input and output buffers.

FIG. 1 further illustrates a morphological analyzer/ generator 2 that includes an inflection module 4, an uninflection (inflection reduction) module 5, a derivation expansion module 6, and an underivation (derivation reduction) module 7. The inflection module 4 and the uninflection module 5 contain structural features that allow the morphological analyzer/generator 2 to produce all inflected forms of a word given its baseform and to produce all baseforms of a word given an inflection. The derivation expansion module 6 and the underivation module 7 contain features that allow the morphological analyzer/generator 2 to produce all derivatives of a word given its derivational baseform and to produce a derivational baseform of a word given a derivation.

Figure 2:
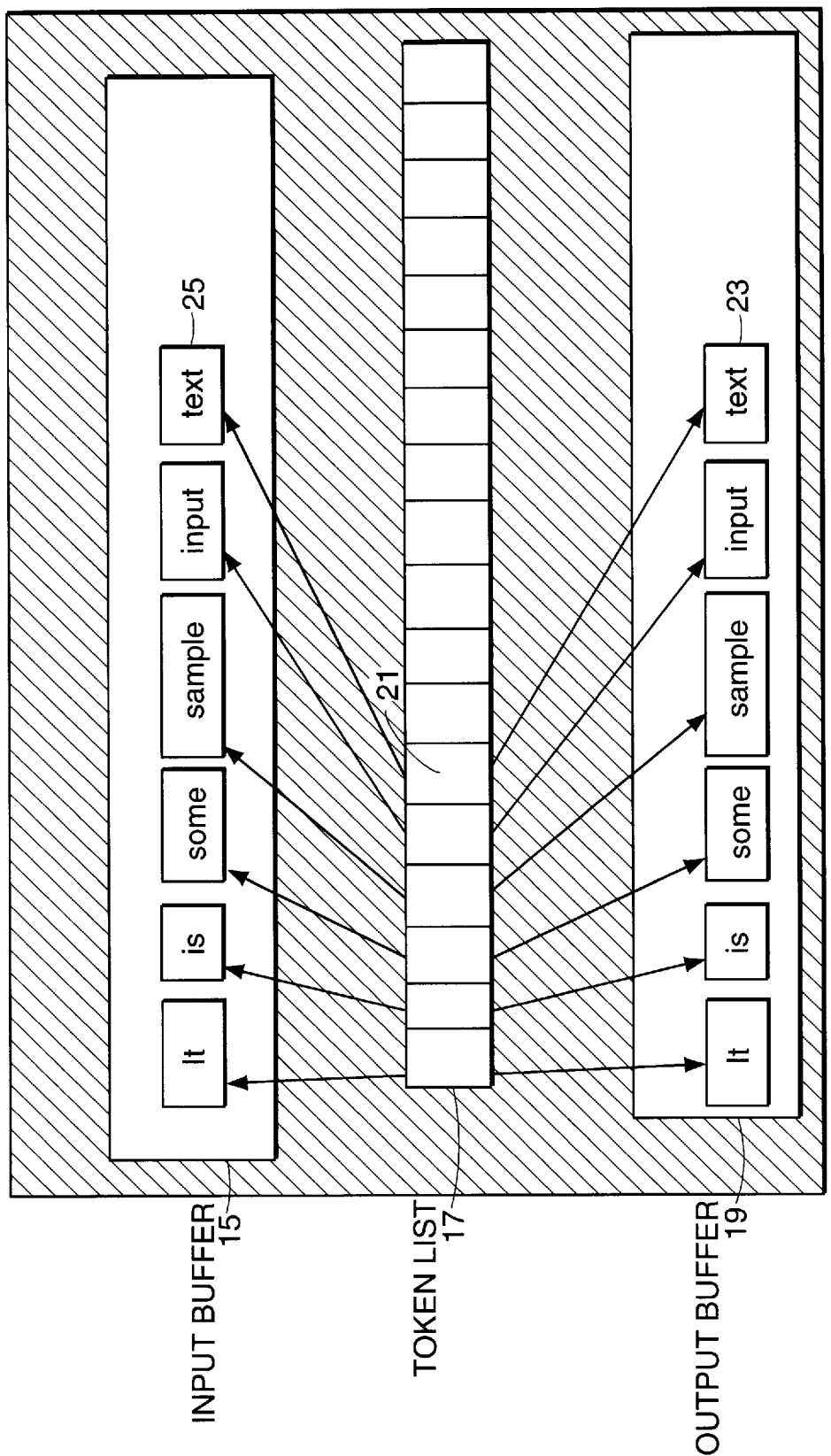
FIG. 2 illustrates a group of data structures formed by the processor of FIG. 1 according to one practice of the invention.

FIG. 2 illustrates one potential operation of multilingual processor 10. In particular, FIG. 2 shows an input buffer 15, a token list 17, and an output buffer 19. The source of text 16 supplies a stream of natural language text to input/output controller 26 that in turn routes the text to processor 30. Processor 30 supplies the application program interface 11 with the stream of text, and places the text in the input buffer 15. Processor 30 initiates operation of the noun-phrase analyzer 13 by making the calls to the interface 11, as described above.

Noun-phrase analyzer 13 operates upon the text contained in input buffer 15 and generates and places in the interface 11 the token list 17 and the output buffer 19. Token list 17 is an array of tokens that describes the relationship between the input and output data. Token list 17 contains a token 21 for each output word 23. Each token 21 links an input word 25 with its corresponding output word 23 by pointing to both the input word 25 and the output word 23. In addition to linking the input and output, each token describes the words they identify. For example, each token 21 can point to a memory address storing information regarding the particular token. Information associated with each particular token can include, for example, the part-of-speech of the token, the capitalization code of the token, the noise-word status of the token, and whether the token is a member of a noun phrase.

In operation, computer 12 obtains a buffer of text from source of text 16, relevant language databases from either the external memory 14 or the internal memory 22, and user selected operations from keyboard 18. Computer 12 then outputs to interface 11 a buffer of text 15, an empty output buffer 19, and the specific operations to be performed on the buffer of text. Noun-phrase analyzer 13 then performs the specified operations on the buffer of text 15 and places the generated output into the output buffer 19 and places the token list 17 that correlates the input buffer of text 15 with the output buffer 19 into the application program interface 11.

THE WORD DATA TABLE

FIG. 3 illustrates a word data table 31 used in conjunction with the multilingual text processor 10. Word data table 31 includes digital codings representative of a list of expressions labeled Exp. $N_1$ through Exp. $N_m$. The word data table acts as a dictionary of expressions, wherein each expression contains a pointer to an entry, such as the representative entry 33. Various word data tables exist, each being representative of either different languages, dialects, technical language fields, or any subgroup of lexical expressions that can be processed by text processor 30.

The word data table 31 can be an addressable table, such as an 11 byte RAM table stored in a portion of either the external memory 14 or in the memory 12. Each representative entry 33 in the word data table describes the characteristics of one or more words. In particular, entry 33 contains a column, labeled item 35, that describes a particular characteristic of a word. Entry 33 also contains a column, labeled item 37, that identifies which bytes, out of a possible 32-byte prefix position, identify a particular characteristic of the word. For example, particular bytes in the 32-byte prefix position can contain bytes representative of a particular word characteristic, such as the capitalization code of word, or particular bits in the 32-byte prefix position can contain bytes that point to a portion of memory in either memory element 22 or memory element 14 that include information pertaining to a particular characteristic of the word, such as the parts-of-speech of a word.

Characteristics of a word stored in representative entry 33 include the part-of-speech combination index of a word, and the grammatical features of the word. In particular the part-of-speech combination index of a word is identified by the labeled field 44 in FIG. 3, while the grammatical features of the word are identified by the labeled fields 32, 34, 36, 38, 40, 42, 46, 48, 50, 52, 54, 56, 58, and 60 in FIG. 3. Additional grammatical features of a word include the word length, the language code, whether the word is an abbreviation, and whether the word is a contraction. Although not shown in FIG. 3, addresses to these additional grammatical features of a word can be stored in a representative entry 33. For example, positions 12–13 in the 32-byte prefix location can identify the word length; positions 1–2 in the 32-byte prefix location can identify the language code; position 19 can indicate whether the word is an abbreviation; and position 20 can indicate whether the word is a contraction. The preferred implementation is for the byte values in the 32-byte prefix to be encoded in a compressed form.

The Capcode Field 32 identifies the capitalization of the word. For example, Capcode Field 32 can store a binary number representative of the capitalization characteristics of the word, such as: "000" can represent all lowercase letters; "001" can represent initial letter uppercase; "010" can represent all uppercase letters; "011" can represent the use of a capitalization map (mixed capitalization); "100" can represent no capitalization, unless the word is located at the beginning of a sentence; and "101" can represent that capitalization is not applicable.

The Dialect Field 34 is used to identify words properly spelled in one dialect, but improperly spelled in another dialect. A common example of this behavior can be demonstrated using the American term color and its British counterpart colour. This field is generally accessed during the decoding process to filter words based on the dialect of the word.

The Has Mandatory Hyphen Field 36 stores information about words which change spelling when hyphenated at the ends of lines. In Germanic languages, the spelling of a word may change if it is hyphenated. This information can be encoded for both the hyphenated and unhyphenated forms of a word. The presence or absence of the hyphen at the Error Position is enough to identify whether the word is correctly or incorrectly spelled. An example is the German word bak-ken, which is the form of the word used when it is hyphenated; without the hyphen, the word is spelled backen. This information links the hyphenated form with its unhyphenated form which would be the form normally used for such information retrieval tasks as indexing.

The Is Derivation Field 38 is used to identify whether a word is a derivation (i.e., is a derived form of a root and therefore should use the derivation pattern to find the root form) or a derivational root (in which case the derivation pattern is used to produce the derived forms of the root). For example, the word readable is a derived form of the derivational root read.

The Restricted/Word-Frequency Field 40 is used to store the word-frequency information about words in the word data table.

The POS Combination Index Field 44 stores an index into the part-of-speech combination table 62, as illustrated in FIG. 4A. The part-of-speech combination table contains a list of parts-of-speech that a word can take. The parts-of-speech are stored with the most frequent part-of-speech tag listed first in the part-of-speech combination table. The order of the other parts-of-speech in this table is unspecified, but implied to be in reverse frequency order. English lists about 650 entries in this table, French about 1900, Swedish about 2000. Other languages fall within this range.

The Noun Inflection Pattern Field 46, the Verb Inflection Pattern Field 48, and the Adjective/Adverb Inflection Pattern Field 50 give the respective pattern numbers used in inflecting or uninflecting noun, verb, and adjective/adverb forms. The pattern number indexes a separate table of inflectional endings and their parts-of-speech. Thus, there is an index to the noun inflection pattern of the word, an index to the verb inflection pattern of the word, and an index to the inflection pattern representative of the inflections of both the adjective and adverbial forms of the word.

The Derivation Pattern Field 52 contains information about how to derive or underive words from this particular word. Derivation patterns are much like inflection patterns. The derivation pattern is an index into a table of derivational endings and their parts-of-speech. The Is Derivation Field 38 described above tells whether the pattern should be used for deriving or underiving. If the bit contained within the Is Derivation Field 38 is not set, the word is a derivational root.

The Compound Info Field 54 indexes another lookup table identifying rules regarding the compounding characteristics of the word. The lookup table contains fields, including a left-most compound component, a right-most compound component, that identify possible positions where the word can be used as a component in a compound word. This information is used for Germanic languages to decompose compounds into their constituents. For example, the German compound Versicherungsgesellschaft (insurance company) can be decomposed into Versicherung (its left-most compound component) and Gesellschaft (its right-most compound component).

The Error Position Field 56 specifies the position of a spelling-changing hyphen.

The LMCC Link Length Field 58 specifies the length of the compound link and is only used for words marked as being a Left-Most Compound Component. In the example above, the left-most compound component Versicherung has a Link Field of 1 since the single character s is used as its compound link.

The Field of Interest Field 60 describes the topic or domain of the given entry. For example, field 60 can differentiate terms used exclusively in Medicine from those that are used exclusively in Law.

FIG. 4A, 4B, and 4C illustrate other tables used by the multilingual text processor and stored in portions of either external memory 14 or internal memory 22. In particular, FIG. 4A shows a Part-of-Speech Combination Table 62 containing a list of indexes 64, a list of part-of-speech tags 66, and a list of OEM tags 68; FIG. 4B shows a Suffix Table 70 having a list of suffixes 72 and having a list of POS indexes 74 to the part-of-speech combination table 62; and FIG. 4C shows a morphological file 71 having a list of paradigm numbers 73 each having a list of associated transformations identified by columns 75, 77 and 79.

These tables can be modified according to particular languages, such that the tables can provide linguistic information for processing text in a particular language. Text processing system 10 can load tables associated with particular language databases when the database block of the application program interface 11 is initialized. This advantageously allows the databases to change without affecting the source code of the application program interface 11, the noun-phrase analyzer 13, or the morphological analyzer/generator 2. Thus, in effect the source code becomes independent of the language being processed. Further in accordance with this invention, multiple languages can be processed by creating a database instance for each language being processed. The languages can be selected from either English, German, Spanish, Portuguese, French, Dutch, Italian, Swedish, Danish, Norwegian, or Japanese. These particular languages are representative of languages having their own specific rules and tables for analyzing noun phrases, but are not included as a limitation of the invention.

THE PART OF SPEECH COMBINATION TABLE

As shown in FIG. 4A, each entry in part-of-speech combination table 62 contains an index 64 having one or more associated part-of-speech tags 66 and having an associated, simpler OEM part-of-speech tag 68 used for display to users of the system. Each index 64 in table 62 identifies one or more part-of-speech tags 66. Thus, all words contained within the word data table are associated with one or more part-of-speech tag 66. If the part-of-speech tag entry 66 includes multiple part-of-speech tags, the most probable tag is the first tag in the entry 66. For example, as illustrated in FIG. 4A, if the Index 64 of a word is 1, the word has a single part-of-speech tag 66 of NN (used to identify generic singular nouns); and if the Index 64 of a word is 344, the word has five possible part-of-speech tags. Furthermore, a word indexed to 344 in the combination table has a most probable part-of-speech tag of ABN (used to identify pre-qualifiers such as half and all), and also has part-of-speech tags of NN (used to identify generic singular nouns), NNS (used to identify generic plural nouns), QL (used to identify qualifying adverbs), and RB (used to identify generic adverbs).

THE SUFFIX TABLE

FIG. 4B illustrates a Suffix table 70 having a list of suffixes 72 and having a list of POS indexes 74 to the part-of-speech combination table 62. Thus, each entry in table 70 has a suffix 72 associated with a POS index 74. In operation, the suffix of a word contained in a stream of text can be compared with suffix entries 72 in table 70. If a match is found for the suffix of the extracted word, then the word can be associated with a part-of-speech tag 66 in part-of-speech table 62 through POS index 74. For example, if a word in the stream of text contains a suffix, le (as in ô'le), that word can be identified in table 70 and be associated with a part-of-speech index "001". The part-of-speech index "001" contains a part-of-speech tag NN (noun), as illustrated in FIG. 4A. Similarly, the word in the stream of text having a suffix am (as in m'am) can be associated with a part-of-speech tag of NN through tables 62 and 70.

THE MORPHOLOGICAL TABLE

FIG. 4C illustrates an exemplary morphological file 71 where each horizontal line shown in the morphological file 71 is a separate morphological paradigm having one or more morphological transforms. Vertical column 73 identifies the numbering of the morphological paradigms, and columns 75, 77, and 79 identify vertical columns containing different morphological transforms associated with any particular morphological paradigm. Each morphological transform is formed of a plurality of functional elements. In operation, the morphological file 71 of FIG. 4C describes how to produce a morphological transform given a baseform.

The morphological transforms identified by columns 75, 77 and 79 are all similarly structured. For example, each transform contains at least two functional elements that indicate one character string to be removed and one character string to be added to a candidate word. The similarity between the transforms allows processor 30 to uniformly apply the functional elements contained in any particular transform without having to consider exceptions to a discrete set of standard rules. The uniformity in the actions of processor 30, regardless of the transform being considered, allows for quick and easy processing.

As shown in FIG. 4C, every morphological transform identified in columns 75, 77 and 79 is structured as follows:

baseform part-of-speech tag__first character string to strip from the candidate word→ second character string to add to the candidate word__ part-of-speech tag of morphological transform

[optional field for prefixation].

Each morphological transform can thus be described as containing a number of functional elements listed in sequence, as shown in FIG. 4C. In particular, the first functional element specifies the part-of-speech tag of the baseform of the candidate word, and the second functional element identifies the suffix to strip from the candidate word to form an intermediate baseform. The third functional element identifies the suffix to add to the intermediate baseform to generate the actual baseform, and the fourth functional element specifies the part-of-speech of the morphological transform. The fifth functional element is an optional element indicating whether prefixation occurs.

FIG. 4C illustrates, in particular, a morphological file suited to inflection and uninflection. For example, inflection transform 001 (as identified by column 73) contains three transformations shown in columns 75, 77 and 79, respectively. The column 75 transformation for inflection transform 001 contains the transform, VB__→d__VBN. This transform contains rules specifying that: (1) the baseform part-of-speech is VB; (2) no suffix is to be stripped from the candidate word to form the intermediate baseform; (3) the suffix d is to be added to the intermediate baseform to generate the actual baseform; (4) the part-of-speech of the resulting inflected form is VBN; and (5) no prefixation occurs. The column 79 transformation for transform 001 contains the transform VB__e→ing VBG. This transform specifies: (1) the baseform part-of-speech is VB; (2) the suffix e is to be stripped from the candidate word to form the intermediate baseform; (3) the suffix ing is to be added to the intermediate baseform to generate the actual baseform; (4) the part-of-speech of the resulting inflected form is VBG; and (5) no prefixation occurs.

A file similar to that shown in FIG. 4C can be constructed for derivation expansion and underivation (derivation reduction). A derivational file, however, will not contain a functional element in the transform identifying part-of-speech information used in specifying whether a candidate word is a derivation or a derivational baseform. Information regarding derivation baseforms is instead stored in the word data table 31 of FIG. 3 under the Is Derivation Field 38.

Morphological file 71 of FIG. 4C also illustrates the use of portmanteau paradigms. Portmanteau paradigms provide a structure capable of mapping the morphological changes associated with words having complicated morphological patterns. In particular, 25 morphological transforms 133, 134, 135, 136 and 137 (as identified in column 73) contain portmanteau paradigm used for associating a plurality of paradigms with any particular candidate word.

Morphological transform 133 indicates that patterns "006" and "002", as identified in 30 column 73, are used to inflect the candidate word associated with morphological transform 133. Accordingly, a candidate word associated with inflection transform 133 becomes further associated with inflection transforms 002 and 006. For instance, the portmanteau paradigm 133 identifies the two inflections of travel, that can be inflected as travelled and traveled, depending upon dialect. Portmanteau paradigm 133 can also be used to inflect install, which can also be spelled instal. The illustrated portmanteau paradigms illustrate one possible structure used for applying multiple paradigms to any particular candidate word.

Another possible structure for providing portmanteau paradigms can be formed using word data table 31 and a representative entry 33, as shown in FIG. 3. For example, expression $N_2$ in data table 31 points to a representative entry 33 having a noun inflection pattern 46, a verb inflection pattern 48, and an adjective/adverb inflection pattern 50. In addition, the patterns 46, 48, and 50 each point to a paradigm in a morphological file 71, as illustrated in FIG. 4C. Thus, a candidate word matched with the expression $N_2$ can become associated with a plurality of paradigms.

FIG. 4C illustrates a further aspect of the invention wherein the applicants' system departs dramatically from the prior art. In particular, a morphological baseform in accordance with the invention can vary in length and does not need to remain invariant. By utilizing baseforms of variable length, the invention removes many of the disadvantages associated with earlier natural language processing techniques, including the need for a large exception dictionary.

The morphological file 71 includes transforms having a variable length baseform, such as paradigm numbers 001 and 004. For example, the column 75 and 77 transforms of paradigm 001 produce a baseform having no characters removed from the candidate word while the column 79 transform of paradigm 001 produces a baseform having an e character removed. The column 75 transform of paradigm 004 produces a baseform having no characters removed while the column 77 and 79 transforms of paradigm 004 produce baseforms having ay character removed from the candidate word. Thus, when processor 30 acts in accordance with the instructions of paradigms 001 or 004 to form all possible baseforms of a candidate word, the processor will form baseforms that vary in length.

Figure 5:
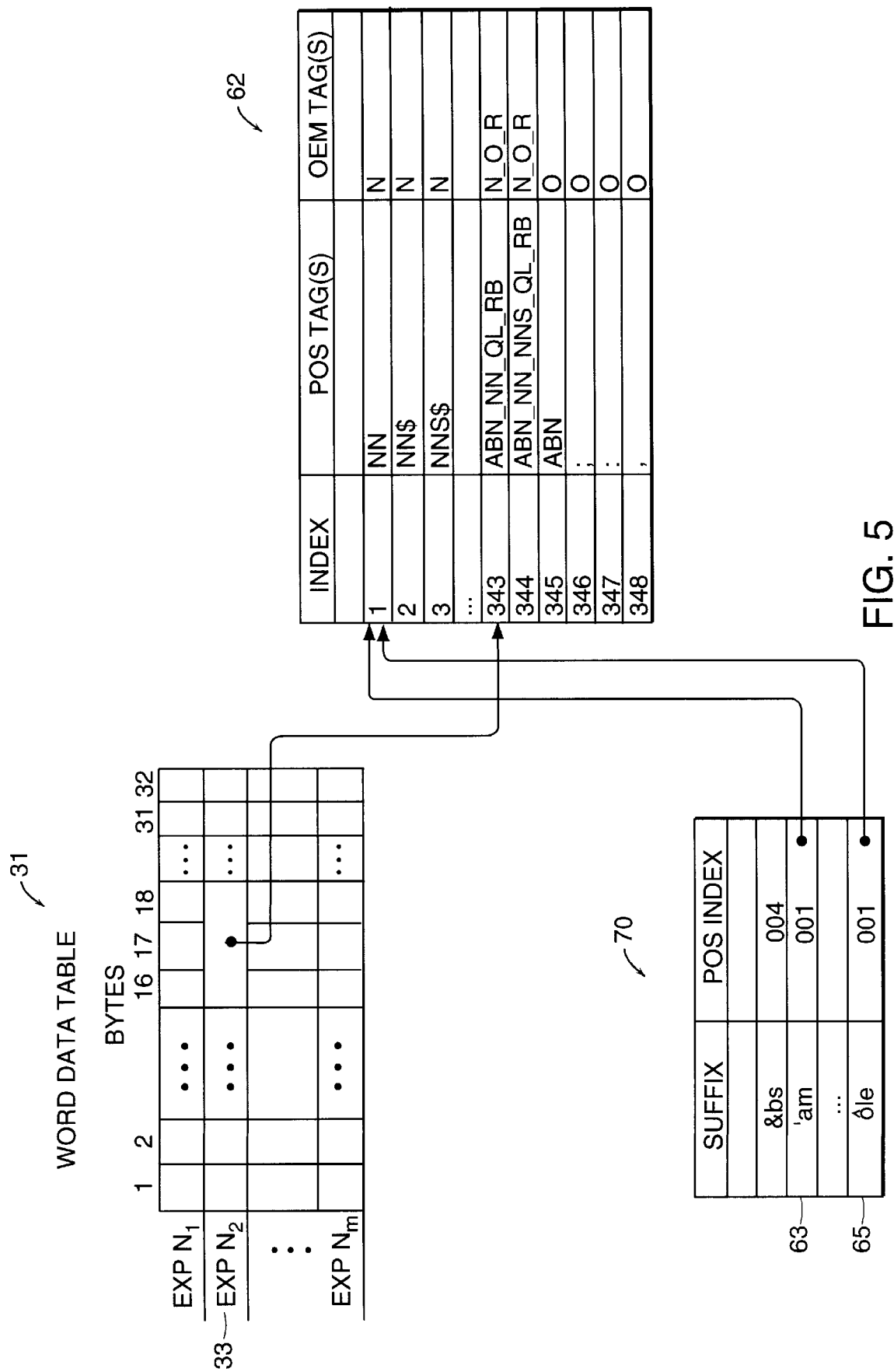
FIG. 5 illustrates possible associations between the tables of FIG. 3, FIG. 4A, and FIG. 4B.

FIG. 5 illustrates a database system stored in various portions of memory elements 14 and 22 showing a connection between tables 31, 62, and 70 for associating part-of-speech tags with various lexical expressions contained within a stream of text. An Expression $N_2$ contained within the stream of text can be identified in the word data table 31 as representative entry 33. Representative entry 33 encodes the information contained in a 32-byte prefix, of which bytes 16–18 contain a code found in the part-of-speech combination table 62. This table in its turn relates this particular part-of-speech combination with index 343 in table 62, thereby associating the part-of-speech tags of ABN (prequalifier), NN (noun), QL (qualifying adverb), and RB (adverb) with Expression $N_2$.

In accordance with a further aspect of the invention, a part-of-speech tag can be associated with an expression in the stream of text through the use of suffix table 70. For example, a first expression in stream of text might contain a suffix 61e, and can be identified in suffix table 70 as representative entry 63. A second expression in the stream of text might contain the suffix ôle, and can be identified in suffix table 70 as representative entry 65. The pointer in representative entry 63 points to index 1 in table 62, and the pointer in representative entry 65 points to index 1 in table 62. Thus, both the first and second expression in the stream of text become associated with the part-of-speech tag of NN.

THE NOUN PHRASE ANALYZER

Figure 6:
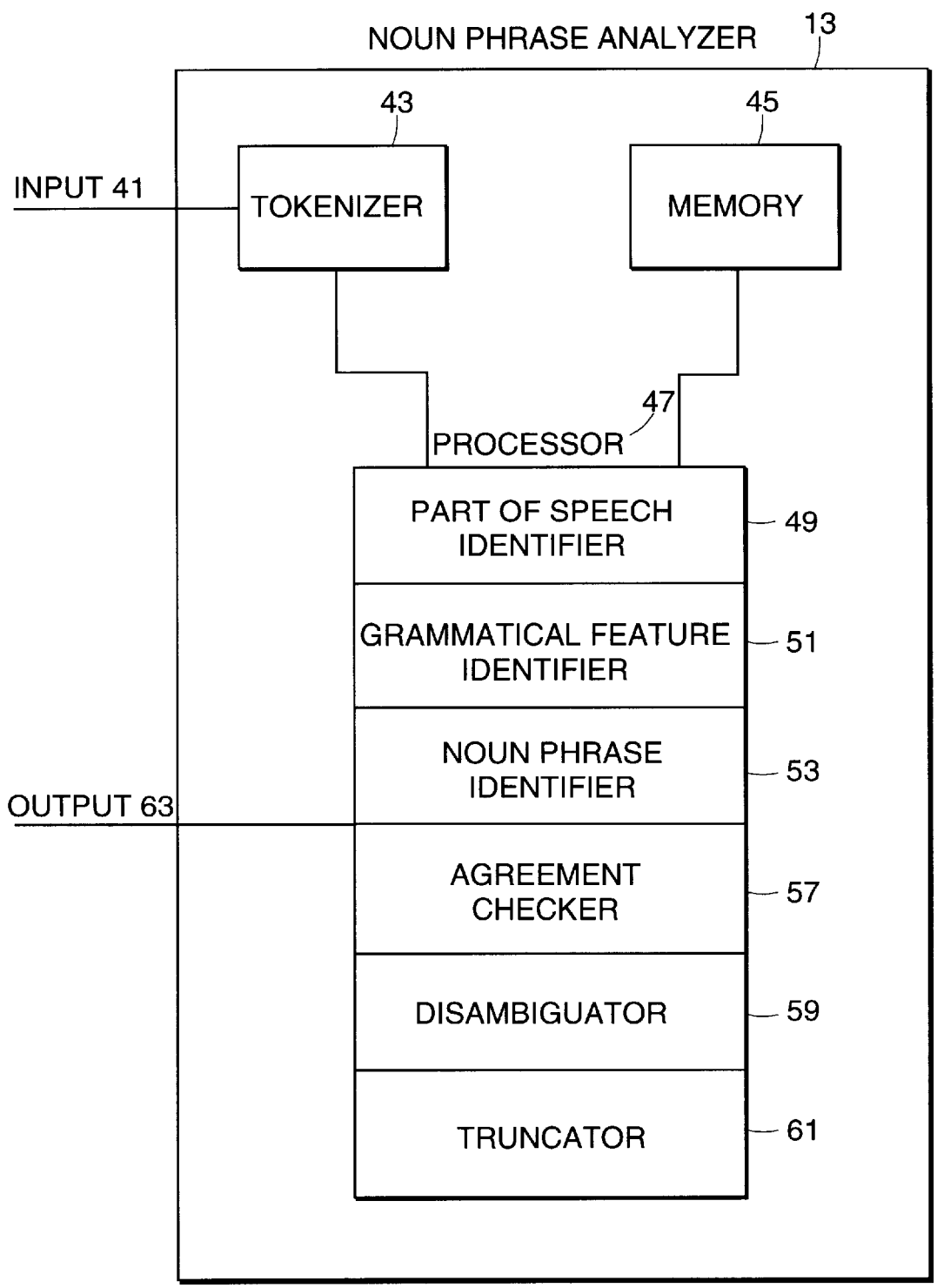
FIG. 6 is a detailed block diagram of a noun-phrase analyzer contained within the text processor of FIG. 1.

FIG. 6 shows a block diagram of a noun-phrase analyzer 13 for identifying noun phrases contained within a stream of natural language text. The analyzer 13 comprises a tokenizer 43, a memory element 45, and a processor 47 having: a part-of-speech identifier 49, a grammatical feature identifier 51, a noun-phase identifier 53, an agreement checker 57, a disambiguator 59, and a noun-phrase truncator 61. Internal connection lines are shown both between the tokenizer 43 and the processor 47, and between the memory element 45 and the processor 47. FIG. 6 further illustrates an input line 41 to the tokenizer 43 from the application program interface 11 and an output line from the processor 47 to the application program interface 11.

Tokenizer 43 extracts tokens (i.e., white-space delimited strings with leading and trailing punctuation removed) from a stream of natural language text. The stream of natural language text is obtained from text source 16 through the application program interface 11. Systems capable of removing and identifying white-space delimited strings are known in the art and can be used herein as part of the noun-phrase analyzer 13. The extracted tokens are further processed by processor 47 to determine whether the extracted tokens are members of a noun phrase.

Memory element 45, as illustrated in FIG. 5, can be a separate addressable memory element dedicated to the noun-phrase analyzer 13, or it can be a portion of either internal memory element 22 or external memory element 14. Memory element 5 provides a space for storing digital signals being processed or generated by the tokenizer 43 and the processor 47. For example, memory element 14 can store tokens generated by tokenizer 43, and can store various attributes identified with a particular token by processor 47. In another aspect of the invention, memory element 14 provides a place for storing a sequence of tokens along with their associated characteristics, called a window of tokens. The window of tokens is utilized by the processor to identify characteristics of a particular candidate token by evaluating the tokens surrounding the candidate token in the window of extracted tokens.

Processor 47, as illustrated in FIG. 6, operates on the extracted tokens with various modules to form noun phrases. These modules can be hard-wired digital circuitry performing functions or they can be software instructions implemented by a data processing unit performing the same functions. Particular modules used by processor 47 to implement noun-phrase analysis include modules that: identify the part-of-speech of the extracted tokens, identify the grammatical features of the extracted tokens, disambiguate the extracted tokens, identify agreement between extracted tokens, and identify the boundaries of noun phrases.

Figure 8:
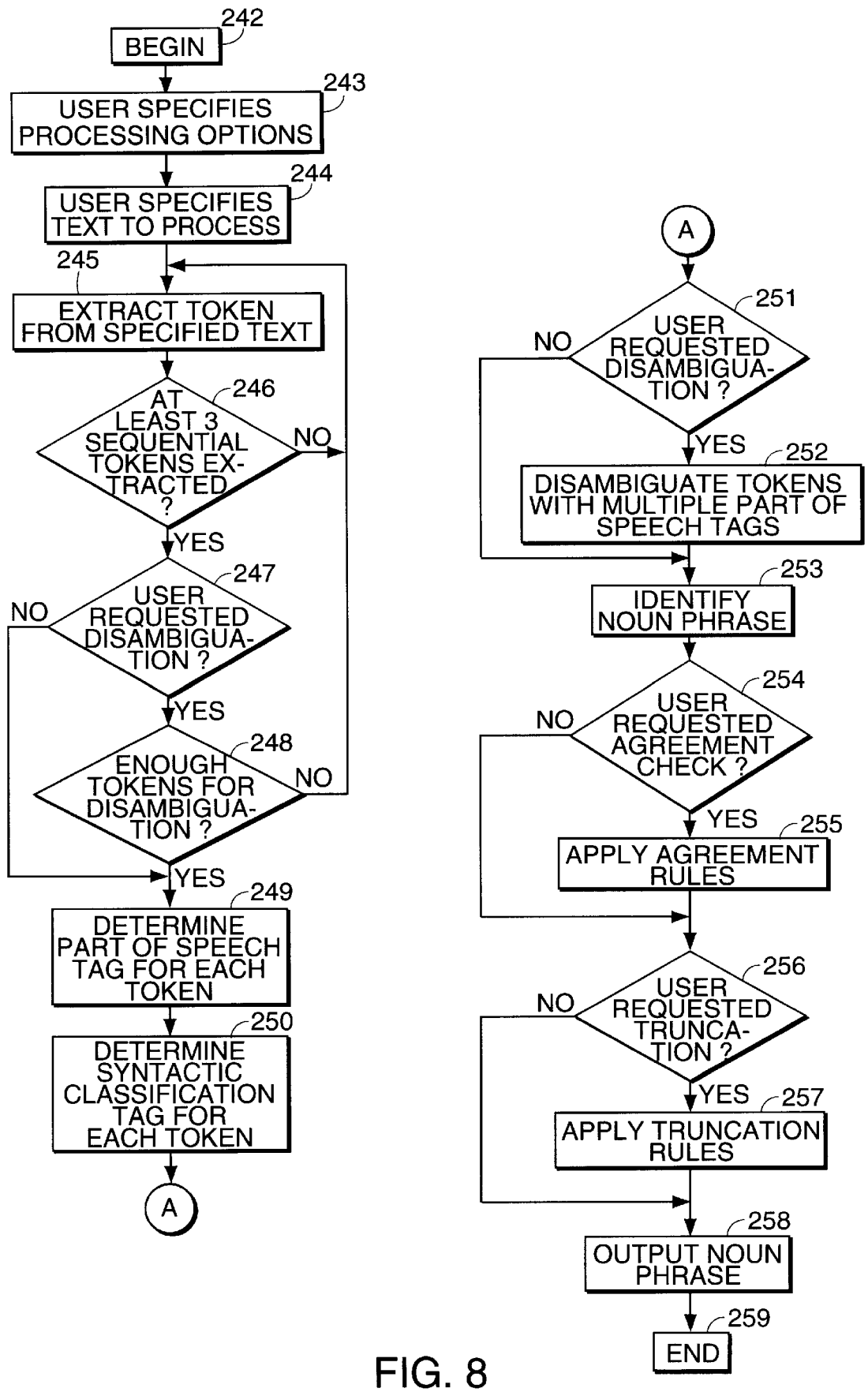
FIG. 8 is a flow chart for the processor shown in FIG. 6.

FIG. 8 depicts a processing sequence of noun-phrase analyzer 13 for forming noun phrases that begins at step 242. At step 243, the user-specified options are input to the noun-phrase analysis system. In particular, those options identified by the user through an input device, such as keyboard 18, are input to text processor 10 and channeled through the program interface 11 to the noun-phrase analyzer 13. The user selected options control certain processing steps within the noun-phrase analyzer as detailed below. At step 244, the user also specifies the text to be processed. The specified text is generally input from source text 16, although the text can additionally be internally generated within the digital computer 12. The specified text is channeled through the application program interface 11 to the noun-phrase analyzer 13 within the Buffer Block. Logical flow proceeds from box 244 to box 245.

At action box 245 tokenizer 43 extracts a token from the stream of text specified by the user. In one embodiment, the tokenizer extracts a first token representative of the first lexical expression contained in the stream of natural language text and continues to extract tokens representative of each succeeding lexical expression contained in the identified stream of text. In this embodiment, the tokenizer continues extracting tokens until either a buffer, such as memory element 45, is full of the extracted tokens or until the tokenizer reaches the end of the text stream input by the user. Thus, in one aspect the tokenizer extracts tokens from the stream of text one token at a time while in a second aspect the tokenizer tokenizes an entire stream of text without interruption.

Decision box 246 branches logical control depending upon whether or not three sequential tokens have been extracted from the stream of text by tokenizer 43. At least three sequential tokens have to be extracted to identify noun phrases contained within the stream of text. The noun-phrase analyzer 13 is a contextual analysis system that identifies noun phrases based on a window of token containing a candidate token and at least one token preceding the candidate token and one token following the candidate token in the stream of text. If at least three tokens have not yet been extracted, control branches back to action box 245 for further token extraction, while if three tokens have been extracted logical flow proceeds to decision box 247.

At decision box 247 the system identifies whether the user-requested disambiguation of the part-of-speech of the tokens. If the user has not requested part-of-speech disambiguation control proceeds to action box 249. If the user has requested part-of-speech disambiguation, the logical control flow proceeds to decision box 248 wherein the system determines whether or not disambiguation can be performed. The noun-phrase analyzer 13 disambiguates tokens within the stream of natural language text by performing further contextual analysis. In particular, the disambiguator analyzes a window of at most four sequential tokens to disambiguate part-of-speech of a candidate token. In one aspect the window of token contains the two tokens preceding an ambiguous candidate token, the ambiguous candidate token itself, and a token following the ambiguous candidate token in the stream of text. Thus, in accordance with this aspect, if four sequential tokens have not been extracted logical flow branches back to action box 245 to extract further tokens from the stream of text, and if four sequential tokens have been extracted from the stream of text logical flow proceeds to action box 249.

At action box 249, the part-of-speech identification module 49 of processor 47 determines the part-of-speech tags for tokens extracted from the stream of text. The part-of-speech tag for each token can be determined by various approaches, including: table-driven, suffix-matching, and default tagging methods. Once a part-of-speech tag is determined for each token, the part-of-speech tag becomes associated with each respective token. After step 249, each token 21 in token list 17 preferably contains the most probable part-of-speech tag and contains a pointer to an address in a memory element containing a list of other potential part-of-speech tags.

In accordance with the table driven aspect of the invention, the part-of-speech tag of a token can be determined using the tables shown in FIGS. 3–5. For example, a representative lexical expression equivalent to the extracted token can be located in the word data table 31 of FIG. 2. As shown in FIG. 2–FIG. 5, module 49 can then follow the pointer, contained in bytes 16–18 of the representative expression in word table 31, to an index 64 in the part-of-speech combination table 62. The index 64 allows module 49 to access a field 66 containing one or more part-of-speech tags. Module 49 at processor 47 can then retrieve these part-of-speech tags or store the index to the part-of-speech tags with the extracted token.

This table-driven approach for identifying the part-of-speech tags of extracted words advantageously provides a fast and efficient way of identifying and associating parts-of-speech with each extracted word. The word data table and the POS Combination Table further provide flexibility by providing the system the ability to change its part-of-speech tags in association with the various language databases. For example, new tables can be easily downloaded into external memory 14 or memory 22 of the noun-phrase system without changing any other sections of the multilingual text processor 10.

In accordance with the suffix-matching aspect of the invention, the part-of-speech tag of a token can be determined using the tables shown in FIGS. 4–5. For example, module 49 at processor 47 can identify a representative suffix consisting of the last end characters of the extracted token in suffix table 70 of FIG. 4B. Once a matching suffix is identified in suffix table 70, module 49 can follow the pointer in column 74 to an index 64 in part-of-speech combination table 62. The index 64 allows module 49 to access a field 66 containing one or more part-of-speech tags. The index 64 allows module 49 to access a field 66 containing one or more part-of-speech tags. The part-of-speech identification module 49 can then retrieve these part-of-speech tags or store the index to the part-of-speech tags with the extracted token. Generally, the suffix-matching method is applied if no representative entry in the word data table 31 was found for the extracted token.

A second alternative method for identifying the part-of-speech tags for the token involves default tagging. Generally, default tagging is only applied when the token was not identified in the word data table 31 and was not identified in suffix table 70. Default tagging associates the part-of-speech tag of NN (noun) with the token. As a result, at the end of step 249 each token has a part-of-speech tag or part-of-speech index that in turn refers to either single or multiple part-of-speech tags. After step 249, logical control flows to action box 250.

At action box 250, the grammatical feature identification module 51 of the processor 47 determines the grammatical features for the tokens 21 contained in the token list 17. The grammatical features for each token can be obtained by identifying a representative entry for the token in the word data table 31 of FIG. 3. The identified representative entry contains information pertaining to the grammatical features of the word in fields 32, 34, 36, 38, 40, 42, 46, 48, 50, 52, 54, 56, 58 and 60. These fields in the representative entry either contain digital data concerning the grammatical features of the token, or point to an address in a memory element containing the grammatical features of the token. After box 250, control proceeds to decision box 251.

Decision box 251 queries whether the user requested disambiguation of the part-of-speech tags. If disambiguation was requested, control proceeds to action box 252. If disambiguation was not requested, control proceeds to action box 253. At action box 252, the part-of-speech tags of ambiguous tokens are disambiguated.

THE DISAMBIGUATOR

The disambiguator module 59 of the processor 47 identifies tokens having multiple part-of-speech tags as ambiguous and disambiguates the identified ambiguous tokens. Accordingly, action box 252 disambiguates those tokens identified as having multiple part-of-speech tags. For example, a first token extracted from the stream of text can be identified in the word data table 31 and thereby have associated with the first token an index 64 to the part-of-speech combination table 62. Furthermore, this index 64 can identify an entry having multiple part-of-speech tags in column 66 of table 62. Thus, the first token can be associated with multiple part-of-speech tags and be identified as ambiguous by processor 47.

Preferably, the first listed part-of-speech tag in table 62, called a primary part-of-speech tag, is the part-of-speech tag having the highest probability of occurrence based on frequency of use across different written genres and topics. The other part-of-speech tags that follow the primary part-of-speech tag in column 66 of table 62 are called the secondary part-of-speech tags. The secondary part-of-speech tags are so named because they have a lower probability of occurrence than the primary part-of-speech tag. The disambiguator can choose to rely on the primary part-of-speech tag as the part-of-speech tag to be associated with the ambiguous token. However, to ensure accurate identification of the part-of-speech for each token, this probabilistic method is not always reliable. Accordingly, in a preferred aspect, the invention provides for a disambiguator module 59 that can disambiguate those tokens having multiple part-of-speech tags through contextual analysis of the ambiguous token.

In particular, disambiguator 59 identifies a window of sequential tokens containing the ambiguous token and then determines the correct part-of-speech tag as a function of the window of sequential tokens. In a first embodiment, the window of sequential tokens can include, but is not limited to, the two tokens immediately preceding the ambiguous token and the token immediately following the ambiguous token. In a second embodiment, the window of sequential tokens includes the ambiguous token, but excludes those classes of tokens not considered particularly relevant in disambiguating the ambiguous token. One class of tokens considered less relevant in disambiguating ambiguous tokens include those tokens having part-of-speech tags of either: adverb; qualifying adverb; or negative adverbs, such as never and not. This class of tokens is collectively referred to as tokens having "ignore tags". Under the second embodiment, for example, the disambiguator module 59 forms a window of sequential tokens containing will run after skipping those words having ignore tags in the following phrases: will run; will frequently run; will very frequently run; will not run; and will never run. The second embodiment thus ensures, by skipping or ignoring a class of irrelevant tokens, an accurate and rapid contextual analysis of the ambiguous token without having to expand the number of tokens in the window of sequential tokens. Moreover, a window of four sequential tokens ranging from the two tokens immediately preceding the ambiguous token and the token immediately following the ambiguous token can be expanded to include additional tokens by: (1) skipping those tokens contained within the original window of four sequential tokens that have ignore tags, and (2) replacing the skipped tokens with additional sequential tokens surrounding the ambiguous token.

The functions or rules applied by module 59 identify the most accurate part-of-speech of the ambiguous token based both upon the window of sequential tokens containing the ambiguous token and the characteristics associated with those tokens contained within the window of tokens. The characteristics associated with the tokens include, either separately or in combination, the part-of-speech tags of the tokens and the grammatical features of the tokens.

Once the disambiguator module 59 of the processor 47 has identified the most accurate part-of-speech tag, the processor places this part-of-speech tag in the position of the primary part-of-speech tag, i.e., first in the list of the plurality of part-of-speech tags associated with the ambiguous token. Thus, the ambiguous target token remains associated with a plurality of part-of-speech tags after the operations of processor 47, but the first part-of-speech tag in the list of multiple part-of-speech tags has been verified as the most contextually accurate part-of-speech tag for the ambiguous token.

In one aspect, disambiguator 59 can determine that no disambiguation rules apply to the ambiguous token and can thus choose to not change the ordering of the plurality of part-of-speech tags associated with the ambiguous token. For example, a token having multiple part-of-speech tags has at least one part-of-speech tag identified as the primary part-of-speech tag. The primary part-of-speech tag can be identified because it is the first part-of-speech tag in the list of possible part-of-speech tags, as illustrated in FIG. 4A. If the disambiguator 59 determines that no disambiguation rules apply, the primary part-of-speech tag remains the first part-of-speech tag in the list.

In a further aspect, a disambiguation rule can be triggered and one of the secondary part-of-speech tags can be promoted to the primary part-of-speech tag. In accordance with another aspect, a disambiguation rule is triggered and the primary part-of-speech tag of the ambiguous token is coerced into a new part-of-speech tag, not necessarily found amongst the secondary part-of-speech tags. An additional aspect of the invention provides for a method wherein a disambiguation rule is triggered but other conditions required to satisfy the rule fail, and the primary part-of-speech tag is not modified. Thus, after disambiguating, each token has a highly reliable part-of-speech tag identified as the primary part-of-speech tag.

FIG. 9 illustrates an exemplary rule table used for disambiguating an extracted token in the English language. As discussed with respect to the tables illustrated in FIG. 3–FIG. 5, the disambiguation tables can differ from language to language. Advantageously, the tables can be added to the system 10 or removed from the system 10 to accommodate various languages without modifying the source code or hardware utilized in constructing the multilingual text processor 10 in accordance with the invention.

The illustrated table contains: (1) a column of rules numbered 1–6 and identified with label 261; (2) a column representing the ambiguous token [i] and identified with label 264; (3) a column representing the token [i+1] immediately following the ambiguous token and identified with label 266; (4) a column representing the token [i−1] immediately preceding the ambiguous token and identified with the label 262; and (5) a column representing the token [i−2] immediately preceding the token [i−1] and identified with the label 260. Accordingly, the table illustrated in FIG. 9 represents a group of six disambiguation rules that are applied by disambiguator 59, as part of the operations of the processor 47, to a window of sequential tokens containing the ambiguous token [i]. In particular, each rule contains a set of requirements in columns 260, 262, 264, and 266, which if satisfied, cause the primary part-of-speech of the ambiguous token to be altered. In operation, processor 47 sequentially applies each rule to an ambiguous token in the stream of text and alters the primary part-of-speech tag in accordance with any applicable rule contained within the table.

For example, rule 1 has a requirement and result labeled as item 268 in FIG. 9. In accordance with rule 1, the processor 47 coerces the primary part-of-speech tag of the ambiguous token to NN (singular common noun) if the ambiguous token [i] is at the beginning of a sentence and has a Capcode greater than 000 and does not have a part-of-speech tag of noun.

Rules 2–6, in FIG. 9, illustrate the promotion of a secondary part-of-speech tag to the primary part-of-speech tag as a function of a window of token surrounding the ambiguous token [i]. In particular, rule 2 promotes the secondary part-of-speech tag of singular common noun to the primary part-of-speech tag if: the token [i−2] has a primary part-of-speech tag of article, as shown by entry 270; the token [i] has a primary part-of-speech tag of either verb or second possessive pronoun or exclamation or verb past tense form, as shown by entry 272; and the token [i] has a secondary part-of-speech tag of singular common noun, as shown by entry 272. Rule 3 promotes the secondary part-of-speech tag of singular common noun to the primary part-of-speech tag if: the token [i−1] has a part-of-speech tag of verb infinitive or singular common noun, as shown by entry 274; and the token [i] has a primary part-of-speech tag of verb or second possessive pronoun or exclamation or verb past tense form and has a secondary part-of-speech tag of singular common noun, as shown by entry 276. Rule 4 promotes the secondary part-of-speech tag of singular common noun to the primary part-of-speech tag if: the token [i−1] has a part-of-speech tag of modal auxiliary or singular common noun, as shown by entry 278; the token [i] has a primary part-of-speech tag of modal auxiliary and has a second part-of-speech tag of singular common noun, as shown by entry 280; and the token [i+1] has a part-of-speech tag of infinitive, as shown by entry 282.

FIG. 9 thus illustrates one embodiment of the invention wherein the disambiguator 59 of the processor 47 modifies the ambiguous target token in accordance with a rule table. In particular, the illustrated rule table instructs processor 47 to modify the part-of-speech tags of the ambiguous token as a function of: the two tokens preceding the ambiguous target token in the stream of text, the token following the ambiguous target token in the stream of text, and the ambiguous target token itself. FIG. 9 further illustrates an embodiment wherein the ambiguous target token is modified as a function of the primary part-of-speech tag and the secondary part-of-speech tags of the ambiguous target token, and the part-of-speech tags of the other token surrounding the target token.

Disambiguation step 252 can also provide for a system that aids in identifying the elements of a noun phrase by checking whether or not the tokens in the stream of natural language text agree in gender, number, definiteness, and case. In particular, processor 47 can validate agreement between a candidate token and a token immediately adjacent (i.e., either immediately preceding or immediately following) the candidate token in the stream of text.

Agreement analysis prior to step 253, wherein the noun phrase is identified, operates in a single match mode that returns a success immediately after the first successful match. Thus, if agreement is being tested for token [i] and token [i−1] in the single match mode, processing stops as soon as a match is found. In accordance with this process, the processor selects the first part-of-speech tag from token [i], and tries to match it with each tag for the token [i−1] until success is reached or all of the part-of-speech tags in token [i−1] are exhausted. If no match is found, then the processor 47 tries to match the next part-of-speech tag in the token [i] with each tag in token [i−1] until success is reached or all of the part-of-speech tags in token [i−1] are exhausted. This process continues until either a match is reached, or all of the part-of-speech tags in both token [i] and token [i−1] have been checked with each other. A successful agreement found between two tokens indicates that the two tokens are to be treated as part of a noun phrase. If no agreement is found, then the two tokens are not considered to be a part of the same noun phrase.

First, the first POS tag from each token in checked for agreement.

|     | Agreement Tags    | Agreement Tags    | Agreement Tags    |
| --- | ----------------- | ----------------- | ----------------- |
| i-1 | Plural, Masculine | Singular, Masculine |                 |
| i   | Singular, Feminine | Singular, Masculine | Plural, Masculine |

(Tag1 & Tag2 & NumberMap) & (Tag1 & Tag2 & GenderMap)
    fails                        fails If this fails, the second POS tag from the token [i−1] is checked for a match:

|     | Agreement Tags    | Agreement Tags    | Agreement Tags    |
| --- | ----------------- | ----------------- | ----------------- |
| i-1 | Plural, Masculine | Singular, Masculine |                 |
| i   | Singular, Feminine | Singular, Masculine | Plural, Masculine |

(Tag1 & Tag2 & NumberMap) & (Tag1 & Tag2 & GenderMap)
    passes                       fails At this point, all of the POS maps in the token [i−1] have been exhausted, and no successful match has been bound. The second POS tag in the token [i] must now be compared with all of the POS tags in the token [i−1].
The first POS tag from the token [i−1] and the second tag from the token [i] are checked for a match:

|     | Agreement Tags    | Agreement Tags    | Agreement Tags    |
| --- | ----------------- | ----------------- | ----------------- |
| i-1 | Plural, Masculine | Singular, Masculine |                 |
| i   | Singular, Feminine | Singular, Masculine | Plural, Masculine |

(Tag1 & Tag2 & NumberMap) & (Tag1 & Tag2 & GenderMap)
    fails                        passes If it fails, the second POS tag from the token [i−1] is checked for agreement:

|     | Agreement Tags    | Agreement Tags    | Agreement Tags    |
| --- | ----------------- | ----------------- | ----------------- |
| i-1 | Plural, Masculine | Singular, Masculine |                 |
| i   | Singular, Feminine | Singular, Masculine | Plural, Masculine |

(Tag1 & Tag2 & NumberMap) & (Tag1 & Tag2 & GenderMap)
    passes                       passes At this point, a match has successfully been made, and all agreement processing stops. The two tokens agree and Single Match mode processing is complete.

After Step 252, logical flow proceeds to Step 253. At step 253, the noun-phrase identifier module 53 of processor 47 identifies the boundaries of noun phrases contained within the stream of natural language text, and marks those tokens forming the noun phrase. In particular, processor 47 identifies the noun-phrase boundaries through contextual analysis of each extracted token in the stream of text. In addition, module 53 marks those tokens forming the noun phrase by tagging tokens contained within the noun phrase. For example, module 53 can associate with: the first token in the noun phrase a tag indicating "the beginning" of the noun phrase; the last token in the noun phrase a tag indicating "the end" of the noun phrase; and those tokens found between the first and last tokens in the noun phrase a tag indicating "the middle" of the noun phrase. Thus, module 53 of processor 47 identifies those tokens that it determines are members of a noun phrase as either "the beginning", "the middle", or "the end" of the noun phrase.

According to one aspect of the invention, the noun-phrase identifier module 53 of processor 47 forms a window of sequential tokens to aid in identifying members of a noun phrase. Further in accordance with this aspect, the window of sequential tokens includes a token currently undergoing analysis, called a candidate token, and tokens preceding and following the candidate token in the stream of text. Preferably, the window of tokens includes the candidate token and one token immediately following the candidate token in the stream of text and one token immediately preceding the candidate token in the stream of text. Thus, the window contains at least three extracted tokens ranging from the token preceding the candidate token to the token following the candidate token inclusive. This window of sequential tokens provides a basis for contextually analyzing the candidate token to determine whether or not it is a member of a noun phrase.

The module 53 analyses characteristics of the window of sequential tokens to determine whether the candidate token is a member of a noun phrase. The characteristics analyzed by processor 47 include, either separately or in conjunction, the part-of-speech tags and the grammatical features of each of the tokens contained within the window of tokens. Module 53 of processor 47 contextually analyzes the candidate token by applying a set of rules or functions to the window of sequential tokens surrounding the candidate token, and the respective characteristics of the window of sequential tokens. By applying these rules, module 53 identifies those candidate tokens which are members of noun phrases contained within the stream of text.

The noun-phrase identification rules are a set of hard-coded rules that define the conditions required to start, continue, and terminate a noun phrase. In general, noun phrases are formed by concatenating together two or more contiguous tokens having parts-of-speech functionally related to nouns. Those parts-of-speech functionally related to nouns include the following parts-of-speech: singular common noun (NN), adjective (JJ), ordinal number (ON), cardinal number (CD). In one embodiment, the noun-phrase rules apply these concepts and form noun phrases from those sequential tokens having parts-of-speech functionally related to nouns.

Thus, for example, a set of four rules in pseudocode for identifying noun phrase is set forth in Table I below.

TABLE I

1  If the token is a member of Noun Phrase Tags
2      start to form a Noun Phrase.
3  If the token is a stop list noun or adjective
4      If the Noun-phrase length is 0
5          don't start the Noun Phrase
6      else
7          break the Noun Phrase
8  If the token is a lowercase noun AND
9  the following token is an uppercase noun
10     break the Noun Phrase
11 If the token is a member of Noun-phrase Tags
12     continue the Noun Phrase.

In Table I, lines 1–2 represent a first rule and provide for identifying as a "beginning of a noun phrase" those candidate tokens having a part-of-speech tag functionally related to noun word forms. That is, the first rule tags as the beginning of a noun phrase those tokens having a part-of-speech tag selected from the group of part-of-speech tags, including: singular common noun, adjective, ordinal number, cardinal number.

Lines 3–7, in Table I, represent a second rule. The second rule provides for identifying as an "end of the noun phrase" those candidate tokens having a part-of-speech tag selected from the group consisting of stoplist nouns and adjectives. The default implementation of the second rule contains the two stoplist nouns (i.e., one and ones) and one stoplist adjective (i.e., such). In particular applications, however, the user may introduce user-defined stoplist nouns and adjectives. For example, a user may chose to treat semantically vague generic nouns such as use and type as stoplist nouns.

In addition, lines 8–10 represent a third rule. This third rules specifies that module 53 of processor 47 is to identify as an "end of the noun phrase" those selected tokens having a part-of-speech tag of noun and having a Capcode Field identification of "000" (i.e., lowercase), when the selected token is followed by an extracted token having a part-of-speech tag of noun and having a Capcode Field identification of "001" (initial uppercase) or "010" (i.e., all uppercase). Thus, in general, the third rule demonstrates identifying the end of a noun phrase through analysis of a group of tokens surrounding a candidate token, and the third rule demonstrates identifying the end of a noun phrase through analysis of the part-of-speech tags and grammatical features of tokens in the window of sequential tokens.

The fourth rule, represented by lines 11–12 in Table I, provides for identifying as a "middle of the noun phrase" those selected tokens having a part-of-speech tag functionally related to noun word forms and following an extracted token identified as part of the noun phrase. For example, a token having a part-of-speech tag functionally related to noun word forms and following a token that has been identified as the beginning of the noun phrase is identified as a token contained within the middle of the noun phrase.

In operation, module 53 in conjunction with processor 47 applies each rule in Table I to each token extracted from the stream of natural language text. These rules allow module 53 to identify those tokens which are members of a noun phrase, and the relative position of each token in the noun phrase. The rules illustrated in Table I are not language-specific. However, other tables exist which contain language-specific rules for identifying noun phrases. Table II–VI, as set forth below, contain language-specific rules.

TABLE II

English Language Noun-Phrase Rules

1   If the token is uppercase AND
2   the token has a Part-of-speech Tag of Singular Adverbial Noun AND
3   the preceding token is a noun
4       break the Noun Phrase
5   If the token is an adjective AND
6   the preceding token is a non-possessive noun
7       break the Noun Phrase
8   If the token is "of" or "&" AND
9   the preceding token is an uppercase noun AND
10  the following token is an uppercase noun
11      form a Noun Phrase starting with the preceding token and
12      continue the Noun Phrase as long as Noun Phrase Tags are
13      encountered.

Table II contains a group of rules, in pseudocode, specific to the English language. For example, lines 1–4 specify a first rule for identifying the end of a noun phrase, lines 5–7 recite a second rule for identifying the end of a noun phrase, and lines 8–13 specify a third rule for identifying the beginning and for identifying the middle of a noun phrase.

TABLE III

German Language Noun-Phrase Rules

1. If the token is an adjective AND
2. the preceding token is a noun AND
3. the following token is a member of Noun Phrase Tags
4.    break the Noun Phrase Table III contains a group of rules, in pseudocode, specific to the German Language. For example, lines 1–4 specify a rule for identifying the end of a noun phrase.

TABLE IV

Italian Language Noun-Phrase Rules

1. If the token is "di" AND
2. the preceding token is a noun AND
3. the following token is a lowercase noun
4.    form a Noun Phrase starting with the preceding token and
5.    continue the Noun Phrase as long as Noun Phrase Tags are
6.    encountered.

Table IV contains a group of rules, in pseudocode, specific to the Italian Language. For example, lines 1–6 specify a rule for identifying the end of a noun phrase.

TABLE V

French and Spanish Noun Phrase Rules

1. If the token is "de" AND
2. the preceding token is a noun AND
3. the following token is a lowercase noun
4.    form a Noun Phrase starting with the preceding token and continue
5. Noun Phrase as long as Noun Phrase Tags are encountered.

Table V contains a group of rules, in pseudocode, specific to the French and Spanish Languages. For example, lines 1–5 recite a rule for identifying the beginning and the middle of a noun phrase.

TABLE VI

French and Spanish and Italian Noun-Phrase Rules

1. If the token is an adjective AND
2. the preceding token is a noun AND
3. the following token is a noun
4.    break the Noun Phrase Table VI contains a group of rules, in pseudocode, specific to the French and Spanish and Italian languages. For example, lines 1–4 recite a rule for identifying the end of a noun phrase.

After action box 253 of FIG. 8, control proceeds to decision box 254 of FIG. 8. At decision box 254 the processor 47 identifies whether the user requested application of the agreement rules to the noun phrase identified in action box 253. If the user did not request application of the agreement rules, control branches to decision box 256. If the user did request application of the agreement rules, logical control proceeds to action box 255 wherein the agreement rules are applied.

At action box 255 the agreement checking module 57 of the processor 47 ensures that the tokens within the identified noun phrase are in agreement. Although English has no agreement rules, other languages such as German, French and Spanish require agreement between the words contained within a noun phrase. For example, French and Spanish require gender and number agreement within the noun phrase, while German requires gender, number, and case agreement within the noun phrase. The grammatical features concerning gender, number, and case agreement are supplied by the grammatical feature fields of the word data table.

FIG. 10 illustrates a pseudocode listing that processor 47 executes to ensure agreement between the various members contained within an identified noun phrase. In particular, processor 47 iteratively checks whether a first identified part of a noun phrase agrees with a second identified part of the noun phrase that immediately follows the first identified part in the stream of text. As described below, processor 47 ensures that each particular extracted token within the noun phrase agrees with all other extracted tokens contained in the noun phrase.

Pictorially, given a series of tokens with their associated agreement tags as shown below, where all tokens shown are valid candidates for being in the noun phrase, it would be possible to form a noun phrase that started with the token [i−2] and continued to the token [i+1] because they all agree with respect to the agreement tags of "Singular, Feminine".

|  | Agreement Tags | Agreement Tags | Agreement Tags |
|---|---|---|---|
| i−2 | Plural, Masculine | Singular, Masculine | Singular, Feminine |
| i−1 | Plural, Masculine | Singular, Feminine | Plural, Feminine |
| i | Singular, Feminine | Singular, Masculine | Plural, Masculine |
| i + 1 | Singular, Feminine | | |

In one embodiment for checking agreement, two temporary array areas, temp1 and temp2, are proposed for storing the tokens while agreement is iteratively checked between the identified parts of the noun phrase.

The token [i−2], identified as the "beginning of the noun phrase" has all of its agreement tags copied to a temporary area, temp1.

| temp1 | Plural, Masculine | Singular, Masculine | Singular, Feminine |
|---|---|---|---|
| temp2 | | | |

All agreement tags for the next token, token [i−1], whose values agree with temp1 area are placed in a second temporary area, temp2.

| temp1 | Plural, Masculine | Singular, Masculine | Singular, Feminine |
|---|---|---|---|
| temp2 | Plural, Masculine | Singular, Feminine | |

As long as there are some identified agreement tags in temp1 and temp2, agreement has passed and the noun phrase can continue to be checked. If there is no match, agreement fails and the noun phrase is broken. When the noun phrase is broken, the last token that agrees with the previous tokens in the noun phrase is re-identified as the "end of the noun phrase".

In the current case being examined, there was agreement between temp1 and temp2, so that the contents of temp2 are copies of temp1, and the next token is retrieved.

| temp1 | Plural, Masculine | Singular, Feminine |
|---|---|---|
| temp2 | | |

All agreement tags for the next token [i] whose values agree with temp1 are placed in the second temporary area, temp2. When this is done, the temporary areas contain:

| temp1 | Plural, Masculine | Singular, Feminine |
|---|---|---|
| temp2 | Singular, Feminine | Plural, Masculine |

Because token [i-2], token [i-1], and token [i] all have the above listed agreement tags in common, the contents of the temp2 area are copied to temp1, and the next token is retrieved.

| temp1 | Singular, Feminine | Plural, Masculine |
|---|---|---|
| temp2 | | |

All agreement tags for the next token [i+1] whose values agree with temp1 are placed in a second temporary area, temp2. When this is done, the second temporary areas contain:

| temp1 | Singular, Feminine | Plural, Masculine |
|---|---|---|
| temp2 | Singular, Feminine | |

Because the token [i-2], token [i-1], token [i], and token [i+1] all have these agreement tags in common, the contents of the temp2 area are copied to temp1, and the next token is retrieved.

| temp1 | Singular, Feminine |
|---|---|
| temp2 | |

At this point, noun phrase processing ends in our example. All the tokens from token [i-2] to token [i+1] had at least one agreement tag in common, and thus passed the agreement test.

In a further embodiment, the agreement checker 57 of the processor 47 creates a "supertag" when checking agreement in accordance with action box 255 of FIG. 8. The supertags allow the agreement module 57 to quickly identify whether the extracted tokens fail to agree, or whether they may agree. In particular, a supertag is created for each extracted word contained within the identified noun phrase by logically OR'ing together all the agreement tags associated with each identified token in the noun phrase.

A supertag associated with one token in the noun phrase is then compared against the supertag associated with the following token in the noun phrase to see if any form of agreement is possible. A form of agreement is possible if the required number, gender, and case parameters agree or contain potential agreements between each of the supertags. If the required number, gender, and case parameters contained in the supertags do not agree, then agreement is not possible. By making this comparison, it can be quickly determined whether or not agreement may exist between the tokens or whether agreement is impossible.

After action box 255, logical flow proceeds to decision box 256. At decision box 256 the processor 47 identifies whether the user requested application of the truncation rules to the noun phrase identified in action box 253. If the user did not request application of the truncation rules, control branches to action box 258. If the user did request application of the truncation rules, logical control proceeds to action box 257 wherein the truncation rules are applied.

At action box 257, the truncator module 61 of the processor 47 truncates the identified noun phrases. In one aspect of the invention, as illustrated by the pseudocode listing of FIG. 11, truncator 61 truncates noun phrases exceeding two words in length which satisfy a specific set of rules. In accordance with another aspect of the invention, the truncator 61 removes tokens within the noun phrase that fail to agree with the other tokens within the noun phrase. Preferably, this operation is achieved by the truncator module 61 operating in conjunction with the agreement checking module 57. For example, agreement module 57 identifies those tokens within the noun phrase that are in agreement and those tokens that are not in agreement, and truncator module 61 re-examines which tokens belong in the noun phrase based upon the agreement analysis of agreement checking module 57. Thus truncator module 61 truncates from the noun phrase the set of tokens following, and including, a token that does not agree with the preceding members of the identified noun phrase.

At action box 258, processor 47 outputs the tokens extracted from the input stream of natural language text into the output buffer 19 of the application program interface 11. Processor 47 also generates the token list 17 that correlates the input buffer of text 15 with the output buffer 19, and places the token list 17 into the application program interface. The generated token list 17 comprises an array of tokens that describe parameters of the input and output data. The parameters associated with each token include the part-of-speech tags, the grammatical features, and the noun-phrase member tags. With this data, processor 30 in digital computer 12 is able to output to display 20 the identified noun phrases contained within the input stream of natural language text.

Figure 12:
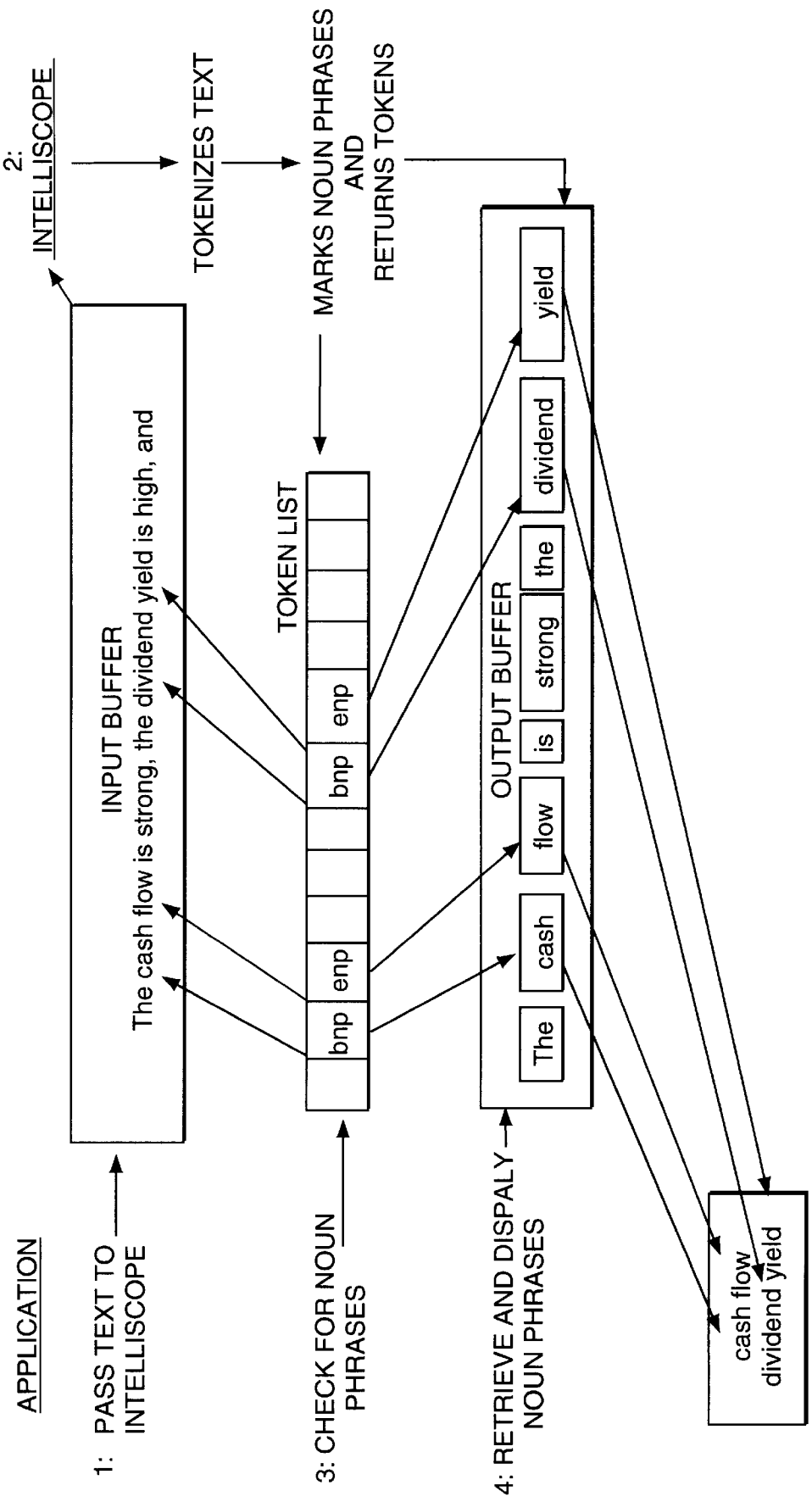
FIG. 12 illustrates an example of noun-phrase analysis in accordance with the invention.

FIG. 12 illustrates an example of the operation of the noun-phrase analyzer 13 having an input buffer 400, a token list 402, an output buffer 404, and identified noun phrases 406. In particular, input buffer 400 contains a natural language text stream reading The cash flow is strong, the dividend yield is high, and. Token list 402 contains a list of tokens, wherein the tokens cash and dividend are identified as the "beginning of a noun phrase", and wherein the tokensflow and yield are identified as the "end of a noun phrase". Output buffer 404 contains a list of the lexical expressions found in the input buffer 400, and box 406 contains the identified noun phrases cashflow and dividendyield.

FIG. 12 demonstrates the ability of the noun-phrase analyzer 10 to identify groups of words having a specific meaning when combined. Simply tokenizing the word in the stream of text and placing them in an index could result in many irrelevant retrievals.

MORPHOLOGICAL ANALYZER/GENERATOR

FIG. 13 illustrates a pseudocode listing for implementing a morphological analyzer/generator 2. In particular, the morphological analyzer can contain a processor 30 implementing the pseudocode listing of FIG. 13 as stored in memory 12. Additional tables, as illustrated in FIG. 4A–4C, necessary for the implementation of morphological analyzer/generator 2 can also be stored in memory element 12.

Lines 1 and 54 of the pseudocode listing in FIG. 13 form a first FOR-LOOP that is operational until the noun form, the verb form, and the adverb/adjective form of the candidate word are each processed. In operation, processor 30 implements the conditions within the first FOR-LOOP of lines 1 and 54 by accessing the FIG. 3 representative entry 33 associated with the candidate word. The representative entry 33 includes a noun pattern field 46, a verb pattern field 48, and an adjective/adverb pattern field 50. Each of the fields (e.g., 46, 48, and 50) identifies a particular morphological transform in FIG. 4C.

Lines 2–4 of the pseudocode listing contain steps for checking whether morphological paradigms associated with each particular grammatical field being processed (i.e. noun, verb, adjective/adverb) exist. The steps can be implemented by processor 30 accessing the FIG. 3 representative entry of the candidate word and identifying whether the fields 46, 48, 50 identify a valid morphological paradigm.

Lines 5–9 of the pseudocode of FIG. 13 include a logical IF-THEN-ELSE construct for determining the morphological paradigms associated with the candidate word. In particular, these steps form a variable called "LIST" that identifies the locations of paradigms. "LIST" can include one location in column 73 of FIG. 4C, or "LIST" can include a portmanteau rule identifying a plurality of locations in column 73.

Lines 10 and 53 of the pseudocode listing form a second FOR-LOOP nested within the first FOR-LOOP of lines 1 and 54. The second FOR-LOOP of lines 10 and 53 provide a logical construct for processing each of the paradigms contained in "LIST".

Lines 11 and 52 form a third nested FOR-LOOP that processes each candidate word once for each part-of-speech tag of the candidate word (identified as "POS tag" in FIG. 13). The part-of-speech tags of the candidate word (i.e. "POS tag") are identified by the POS Combination Index Field 44 of FIG. 3 that is associated with the candidate word.

In one aspect of the invention, lines 12–18 include steps for identifying morphological transforms of the candidate word given a part-of-speech tag for the candidate word and given a morphological paradigm for the candidate word. For example, the pseudocode instructions determine whether the baseform part-of-speech tag of the morphological transform (identified as "BASE POS" in FIG. 13) matches the part-of-speech tag of the candidate word. If a match is found, then the morphological transform is marked as a possible morphological transform for the candidate word, and the candidate word can be identified as a baseform.

Lines 27 and 51 of FIG. 13, in accordance with another aspect of the invention, contain a further nested FOR-LOOP. This FOR-LOOP operates upon each of the morphological transforms listed in the particular paradigm from 'LIST' that is currently being processed.

Further in accordance with the invention, each morphological transform within the current paradigm being processed is inspected to determine whether the morphological transform is an appropriate morphological transform for the candidate word. In particular, as illustrated by pseudocode lines 28–31, processor 30 identifies an appropriate morphological transform based upon whether a parameter of the candidate word matches a morphological pattern contained within a selected morphological transform, For instance, line 28 of the pseudocode determines whether the part-of-speech tag of the candidate word matches the part-of-speech tag of the morphological transform. If a match exists, the morphological transform is identified as an applicable transform for the candidate word.

In accordance with another embodiment of the invention, as shown in pseudocode lines 28–29 of FIG. 13, the processor 30 can identify an appropriate morphological transform based upon various parameter of the candidate word matching various morphological patterns contained within a selected morphological transform. The parameters of the candidate word can include: information contained within the representative entry 33, of FIG. 3; the length of the candidate word; and the identity of the character strings forming the candidate word, i.e. the suffixes, prefixes, and infixes in the candidate word. While the morphological patterns of a selected morphological transform are generally selected from the functional elements contained in the morphological transform. Thus, the morphological patterns can be selected from: a functional element defining the part-of-speech tag of the baseform; a functional element defining the character string to strip from a candidate word; a functional element defining the character string to add to a candidate word; and a functional element defining the part-of-speech tag of the morphologically transformed candidate word.

For example, the processor 30 can compare the suffix of a candidate word with the second finctional element of the selected morphological transform, wherein the second functional element generally denotes the suffix to strip from the candidate word to form an intermediate baseform. In an alternative embodiment, the processor 30 can compare the prefix of the candidate word with the second functional element of the selected morphological transform. While in another embodiment the processor 30 compares the infix of the candidate word with the second functional element of the selected morphological transform. Following the comparison step, processor 30 then identifies those morphological transforms having morphological patterns matching the selected parameter of the candidate word as an appropriate transform for the candidate word.

Preferably, as illustrated in lines 28–31 of the FIG. 13 pseudocode listing the processor 30 only applies those transforms that both: (1) have a part-of-speech tag matching the part-of-speech tag of the candidate word; and (2) have a first character string to be removed from the candidate word that matches either a suffix, prefix, or infix in the candidate word.

According to a further embodiment of the invention, prefixation and infixation can be handled by separate structural elements in the system, as illustrated by pseudocode lines 32–35 of FIG. 13. Lines 32–35 illustrate a separate modular element for determining an applicable transform based on prefixation. Lines 32–35 first identifies whether the current morphological transform has the prefix flag set, as described in the discussion of FIB. 4C. If the prefix flag is set, a separate morphological prefix table containing morphological changes applicable to prefixes is referenced. The prefix table can be identified through the representative word entry 33 for the candidate word.

The prefix table will provide a list of baseform and inflection prefix pairs. To handle prefixation, the processor 30 will locate the longest matching prefix from one column in the prefix table, remove it, and replace it with the prefix from the other column. Preferably, these modifications will only be done when a morphological transform is tagged as requiring a prefix change. An analogous system can be created to address infixation.

Prefixation and infixation morphology are particularly applicable in Germanic languages, such as German and Dutch. In these languages the morphology of the word can change based upon the alteration of a character string in the beginning, middle, or end of the word. For example, German verbs display significant alternations in the middle and end of words: the verb einbringen (ein+bringen) forms its past participle as ein+ge+bracht, with the infixation (insertion) of the string ge between the verbal prefix and stem; and the transformation of the stem bringen into bracht.

The morphological analyzer/generator 2 illustrated in FIG. 13 provides a system capable of morphologically transforming words found within natural language text. For example, the multilingual text processor 10 of FIG. 1 can extract the candidate word drinks from a stream of text and forward the candidate word to analyzer/generator 2 through interface 11. The text processor 10 can further identify a representative entry 33 for the candidate word. Once a representative entry is located, the text processor 10 can provide information concerning the word drinks, such as the parts-of-speech and inflectional paradigms. In particular, the text processor 10 determines the parts-of-speech of drinks to be noun plural and verb 3rd singular present; and the text processor determines the locations of a noun inflectional paradigm, a verb inflectional paradigm, an adjective/adverb paradigm, and a derivational paradigm.

After the text processor 10 obtains the data related to the candidate word drinks, the text processor can generate the appropriate morphological transforms in accordance with the pseudocode listing of FIG. 13. The morphological analyzer/generator 2 first addresses the noun inflectional paradigm, and determines that the noun paradigm has only one paradigm. Analyzer/generator 2 then processes the candidate word by applying the inflectional transforms contained within the identified noun paradigm to each part-of-speech of the candidate word drinks. The inflectional transforms within the noun paradigm are applied by first determining which inflectional transforms should be applied, and by then applying those inflectional transforms to generate inflectional baseforms.

For instance, the candidate word contains a part-of-speech of noun plural which must first be matched with particular inflectional transforms contained within the noun paradigm. The matching can be accomplished, in one embodiment, by comparing the parts-of-speech associated with a particular transform to the part-of-speech of the candidate words. Thus, analyzer/generator 2 compares the current part-of-speech of the candidate word, i.e., noun plural, to the part-of-speech tags associated with the inflectional transforms stored in the noun inflectional paradigm. The analyzer determines: (1) the baseform part-of-speech of the noun paradigm is noun singular, that does not match the part-of-speech tag of the candidate word; (2) the first inflectional transform has as associated part-of-speech tag of noun singular possessive, that does not match the part-of-speech tag of the candidate word; and (3) the second inflectional transform has an associated part-of-speech tag of noun plural, that does match the associated part-of-speech tag of the candidate word. These comparison steps indicate that only the second inflectional transform matched the noun plural part-of-speech of the candidate word, and that therefore only the second inflectional transform contained within the noun paradigm is applied.

Analyzer/generator 2 then continues to process the candidate word by applying the inflectional transforms contained within the identified verb paradigm and the identified adjective/adverb paradigm. The verb paradigm contains one paradigm having a baseform and two inflectional transforms, while the candidate word is associated with a potentially matching part-of-speech tag of verb 3rd singular present. The baseform part-of-speech tag of the verb inflectional paradigm is "verb infinitive", that does not match the part-of-speech tag of the candidate word. The part-of-speech tag of the first inflectional transform is verb present participle, that does not match the part-of-speech tag of the candidate word. But, the part-of-speech tag of the second inflectional transform is verb 3rd singular present, that does match the part-of-speech tag of the candidate word. Thus, the inflectional transform contained within the second rule of the verb inflectional paradigm is applied to the candidate word.

After the application of the noun paradigm and the verb paradigm, the analyzer 2 processes the transforms contained within the adjective/adverb paradigm. In this particular case, the adjective/adverb paradigm is blank, thereby completing the inflectional transformation of the candidate word drinks.

Figure 14A:
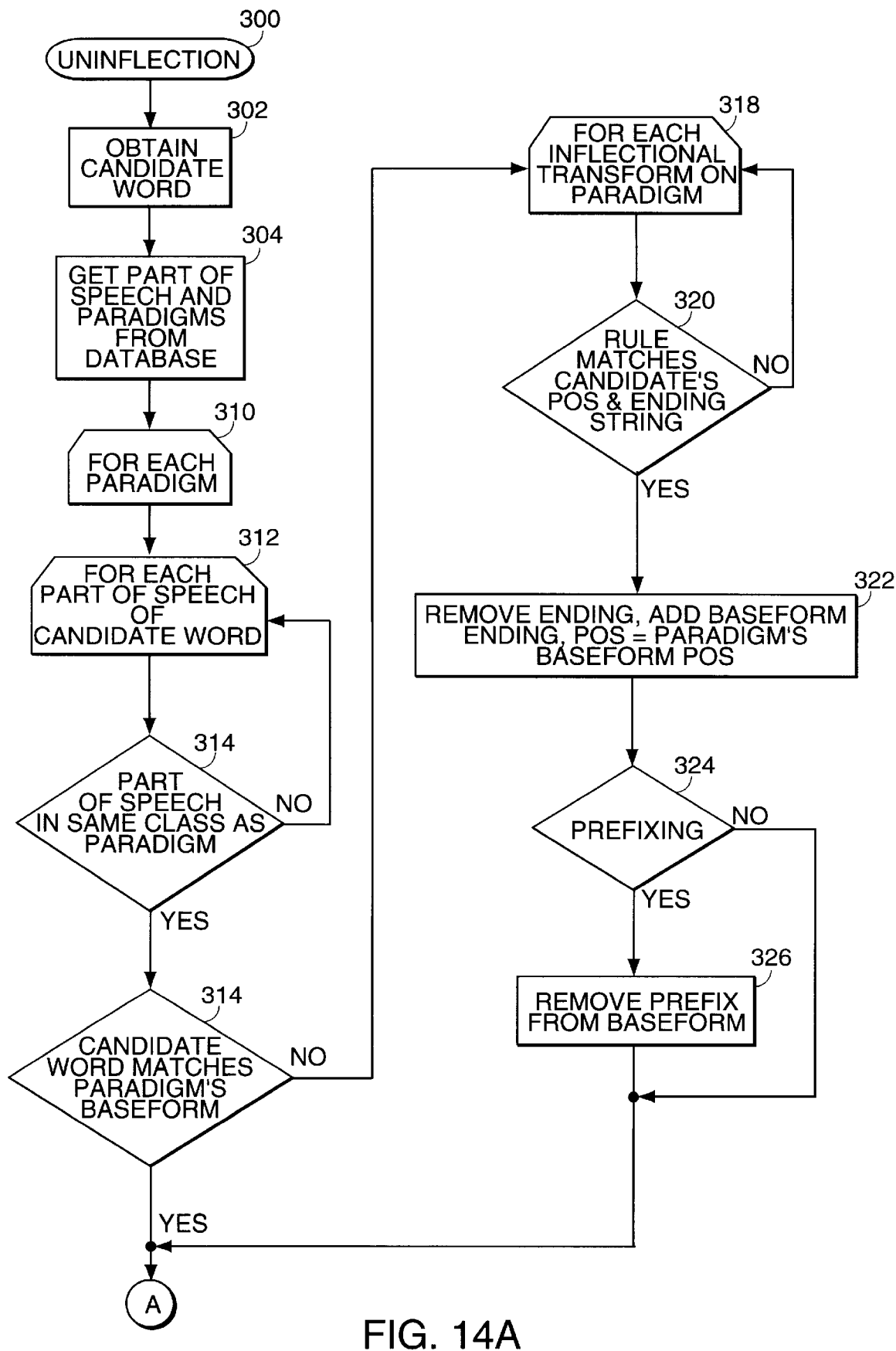
FIG. 14 is a flow chart for the uninflection (inflection reduction) module of FIG. 1.
Figure 14B:
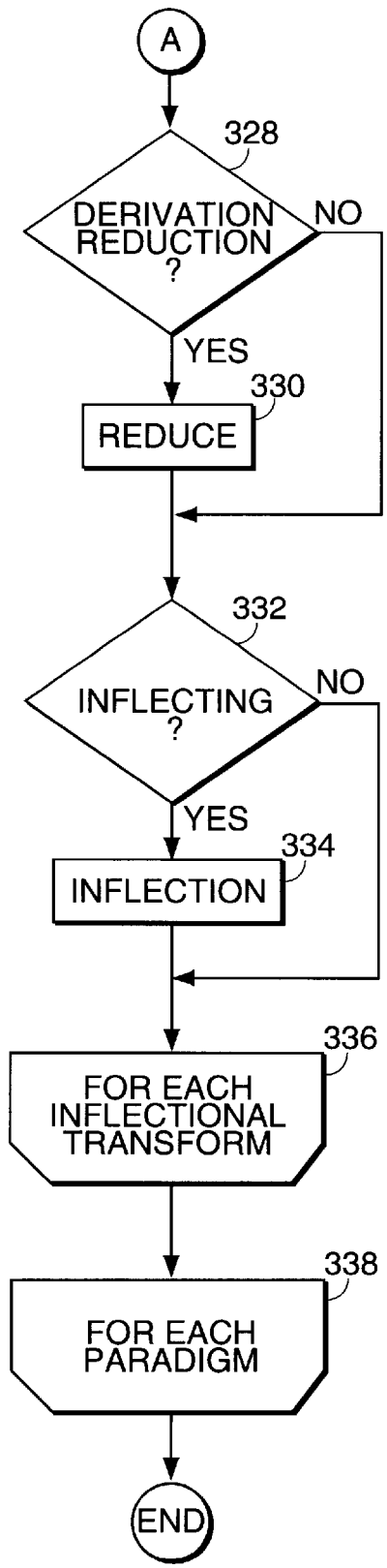

FIG. 14 depicts a processing sequence for the uninflection module 5 for generating inflectional baseforms that begins at step 300. At step 302 the candidate word for the inflectional analysis is obtained. Preferably, the candidate word is obtained from a stream of natural language text by tokenizer 43 as described in connection with FIG. 6. After step 302, logical flow proceeds to step 304.

At step 304 the processor 30 obtains data relevant to the candidate word. This data is obtained by first finding a substantially equivalent expression to the candidate word in the word data table 31. The substantially equivalent expression in the word data table 31 is then accessed to obtain an associated representative entry 33. A representative entry 33 contains data such as the part-of-speech combination index, the noun inflection paradigms, the verb inflection paradigms, and the adjective/adverb inflection paradigms. The data obtained from representative entry 33 can also identify portmanteau paradigms that act as branching points to multiple numbers of other paradigms. At action box 310, the flow chart indicates the beginning of the analysis of each paradigm.

At steps 312 and 314 the system determines whether the part-of-speech of the candidate word is in the same class as the current paradigm. For example, the processor determines whether the part-of-speech of the candidate word is the same as the part-of-speech of the paradigm identified by either the noun field 46, the verb field 48, or the adjective/adverb field 50 in the representative entry 33. If the part-of-speech of the candidate word is not in the same class as the current paradigm, logical flow branches back to action block 312. If the part-of-speech tag of the candidate word agrees with the current paradigm, then logical flow proceeds to decision box 316.

Decision box 316 illustrates one preferred embodiment of the invention, wherein the candidate word is compared to the paradigm's baseform. If the candidate word matches the paradigm baseform, logical flow proceeds to decision box 328. That is, if the candidate word matches the subparadigm's baseform no uninflection is necessary. In many situations, however, the candidate word will not match the paradigm baseform. When the candidate word differs from the paradigm baseform, logical flow proceeds to action box 318.

Action box 318 begins another logical FOR-LOOP wherein each inflectional transform is processed. In accordance with FIG. 14, logical flow proceeds from box 318 to decision box 320.

At decision box 320 two aspects of the invention and a preferred embodiment are illustrated. In particular, action box 320 indicates that the part-of-speech tag of the candidate word can be compared with the fourth functional element of the inflectional transform (i.e. the functional element specifying the part-of-speech of the transform). If the part-of-speech tags matches, then logical flow proceeds to action box 322. However, if the part-of-speech tags differ, logical flow branches back to box 318. According to a further aspect of the invention, as illustrated in action box 320, the ending character strings of the candidate word and the second functional element of the inflectional transform (i.e. the finctional element specifying the suffix to strip from the candidate word) are compared. If the character strings do not match, logical flow proceeds back to action box 318 while if the character strings match, logical flow proceeds to action box 322. Preferably, as illustrated in FIG. 14, the uninflectional module 5 compares the part-of-speech tags associated with the inflectional transform and the candidate word, and the uninflectional module 5 compares the character strings associated with the inflectional transform and the candidate word. According to this preferred embodiment, only if the part-of-speech tags match and the character strings match does logical flow proceed to action box 322.

At step 322, uninflection module 5 implements a strip and add algorithm to form the inflectional baseform of the candidate word. The strip and add algorithm is obtained from the inflectional transform currently being processed. The transform currently being processed indicates a particular character string to be removed from the candidate word and a subsequent character string to be added to the character word to form the inflectional baseform. After step 322, logical flow proceeds to decision box 324.

Decision box 324 is an optional step involving prefixation. If prefixation operations are requested by the user, boxes 324 and 326 will be activated. At decision box 324 the processor 30 identifies whether the inflectional transform currently being considered has a prefixation rule associated with it. If the transform does contain the prefixation rule logical flow proceeds to action box 326, otherwise logical flow proceeds to action box 328. At action box 326 the prefix is removed from the baseform in accordance with the inflectional transform. Logical flow then proceeds to box 328.

Steps 328, 330, 332, and 334 are optional steps demonstrating one implementation of the coupling between the inflection module 4, the uninflectional module 5, the derivation expansion module 6, and underivation (derivation reduction) module 7.

In particular, action box 328 identifies whether the user has requested underivation (derivation reduction). If underivation (derivation reduction) has been requested, logical flow proceeds to action box 330, otherwise flow proceeds to decision box 332. At action box 330 the candidate word undergoes underivation (derivation reduction) in accordance with the flowchart identified in FIG. 16. Following underivation (derivation reduction), logical flow proceeds to decision box 332. At decision box 332 the processor identifies whether inflection has been requested. If inflection was requested, logical flow proceeds to action box 334, wherein the candidate word undergoes inflection analysis in accordance with the steps illustrated in FIG. 15. If inflection was not requested, logical flow proceeds directly to action box 336.

At action box 336 the logical FOR-LOOP for the inflectional transform ends and at action box 338 the logical FOR-LOOP for the paradigms ends, thereby completing the uninflection routine.

Figure 15:
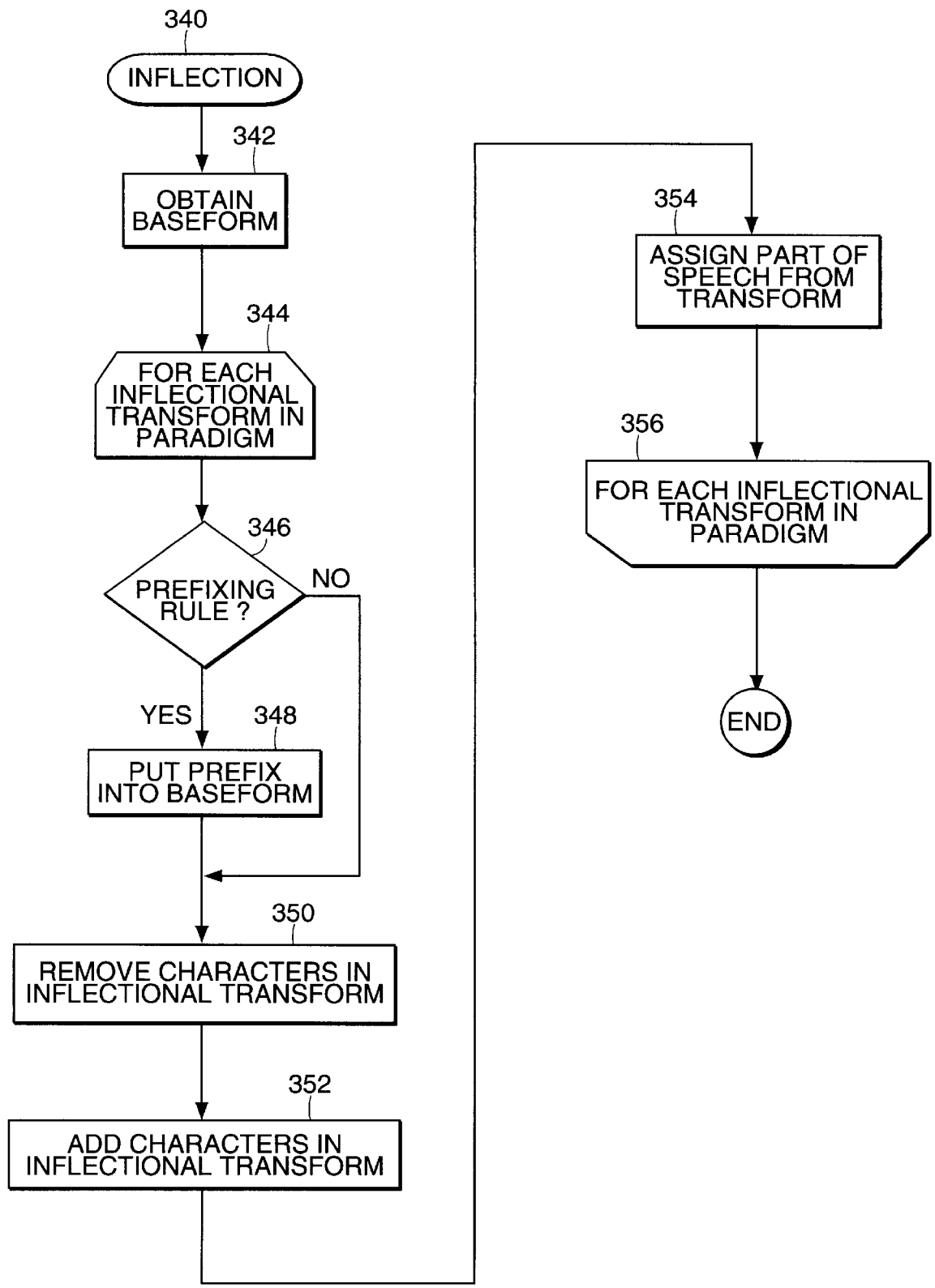
FIG. 15 is a flow chart for the inflection expansion module of FIG. 1.

FIG. 15 depicts a processing sequence for the inflection module 4 of the morphological analyzer of FIG. 1. The inflection analysis begins at step 340 and logical control proceeds to action box 342. At action box 342 the inflection module 4 obtains an inflectional baseform of a candidate word. The inflectional baseform can be obtained, for example, from a candidate word which is processed by the uninflection module 5 in accordance with FIG. 14. After action box 342, logical flow proceeds to action box 344.

Box 344 begins a logical FOR-LOOP that is applied to each inflectional transform in the paradigm associated with the candidate word.

At action box 346 and 348 the inflection module attends to prefixing if prefixing processing was requested by the user of the text processing system 10. Decision box 346 determines whether a prefixing rule is contained within the inflectional transform, and if such a prefixing rule is present the rule is applied at action box 348. After boxes 346 and 348, logical flow proceeds to box 350.

At step 350 characters are removed from the baseform to form an intermediate baseform, and at step 352 characters are added to the intermediate baseform to form the inflected pattern. Thereafter, action box 354 assigns the part-of-speech tag associated with the applied inflectional transform to the newly generated inflected form. Action box 356 ends the FOR-LOOP begun at action box 344.

Figure 16:
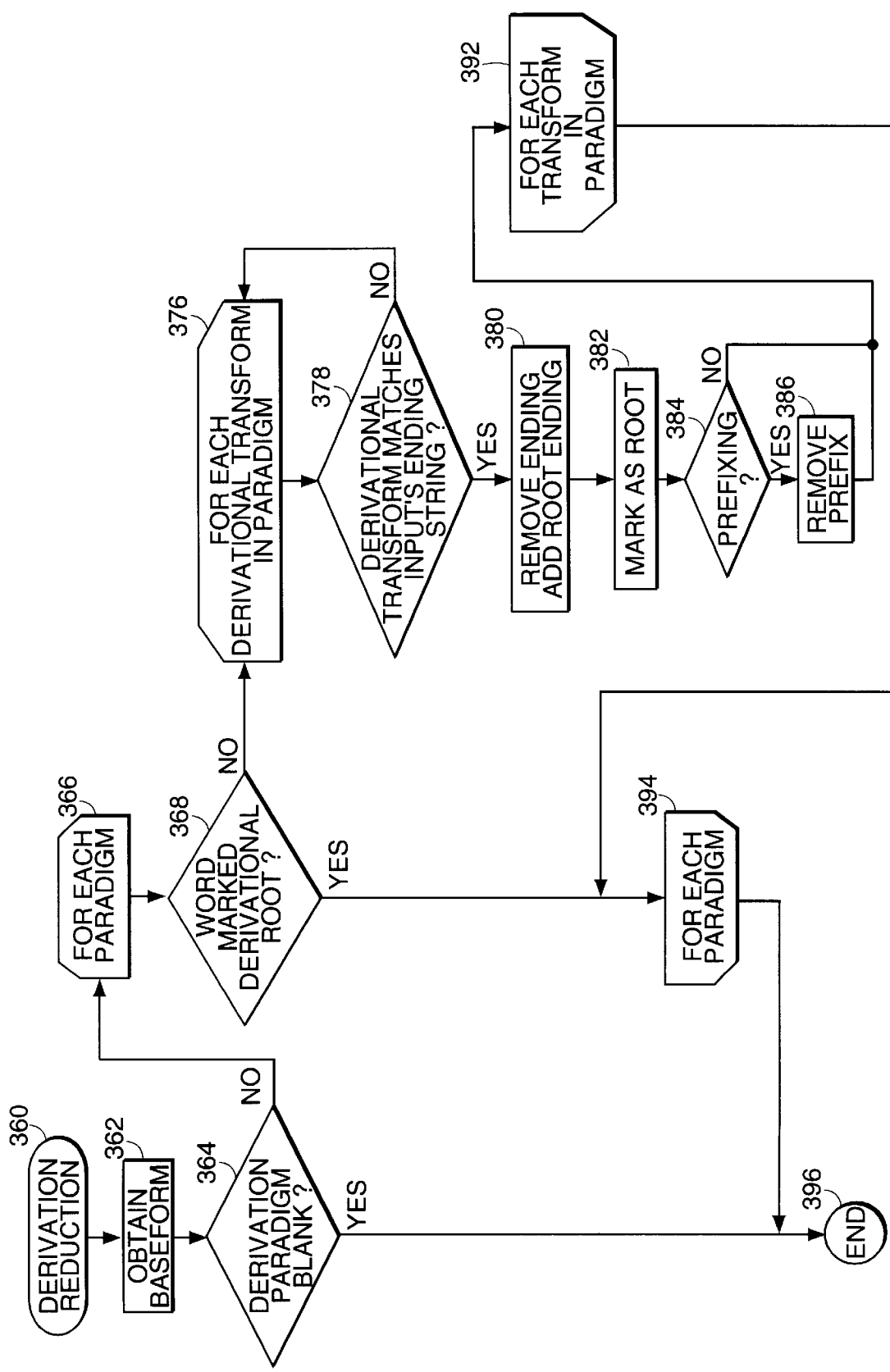
FIG. 16 is a flow chart for the underivation (derivation reduction) module of FIG. 1.

FIG. 16 depicts a further processing sequence for the underivation (derivation reduction) module 7 of the morphological analyzer 2, that begins at step 360. At action box 362 underivation (derivation reduction) module 6 obtains a baseform of the candidate word. The baseform can be obtained from the uninflection module 5. After action box 362, control proceeds to box 364.

Decision box 364 identifies whether the derivation paradigm is an empty set or whether it contains morphological transforms. In particular, if derivational paradigms do not exist for this baseform, logical flow proceeds to action box 396 ending the underivation (derivation reduction) process. However, if the derivation paradigm is not blank, logical control continues to box 366.

Box 366 begins a logical FOR-LOOP for processing each derivational paradigm. After box 366, control proceeds to decision box 368.

Decision box 368 examines whether the candidate word is a derivational root or not. Determination of the derivation root characteristics of the word can be performed by analyzing the information contained within the representative entry 33 associated with the candidate word. For example, the Is Derivation Field 38 of FIG. 3 identifies whether the candidate word is a derivational root. If the candidate word is marked as a derivational root, logical flow proceeds to action box 394, otherwise logical flow proceeds to action box 376.

Action box 376 begins a logical FOR-LOOP for processing each derivational transform in the subparadigm. After action box 376, logical flow proceeds to decision box 378.

Decision box 378 determines whether the derivational transform includes a character string matching the candidate word's ending string. If no match is found, logical flow will proceed to action box 376, otherwise logical flow will proceed onto box 380.

At action box 380, the derivational reduction module 7 implements the transform for changing the candidate word into the derivational baseform of the word. This process is implemented by removing a first character string from the candidate word and adding a second character string to the candidate word in accordance with the derivational transform. At box 382, the newly transformed word is marked as a derivational root. After box 382, flow proceeds to decision box 384.

Boxes 384 and 386 are optional boxes providing prefixing adjustments to the newly formed derivational root. For example, decision box 384 determines whether a prefixing rule exists within the derivational transform and if such a prefixing rule exists then insures that logical flow proceeds to action box 386. At action box 386, the prefix is removed to generate a more accurate derivational root. After the implementation of optional boxes 384 and 386, logical flow proceeds on to box 392.

At box 392, the FOR-LOOP which began with box 376 ends. Box 394 ends the logical FOR-LOOP associated with action box 366. Once each of the paradigms has been completely processed logical flow will proceed from box 394 to box 396. Box 396 indicates the end of the underivation (derivation reduction) module.

Figure 17:
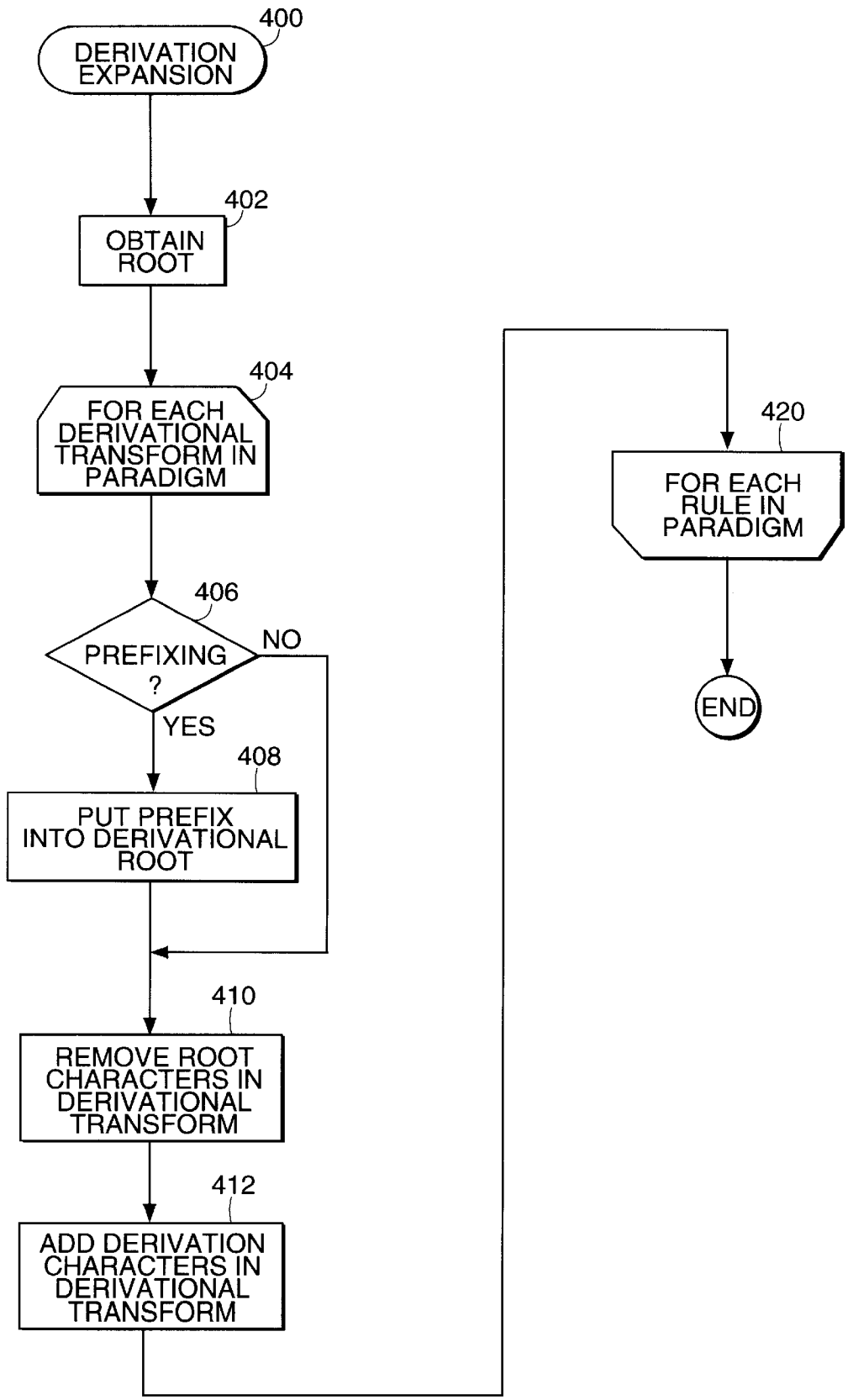
FIG. 17 is a flow chart for the derivation expansion module of FIG. 1.

FIG. 17 illustrates a processing sequence of derivation expansion module 6 for generating derivatives of the candidate word. Operation of the derivation expansion module begins at step 400, after which logical control proceeds to action box 402. At action box 402 the derivation expansion module obtains the derivational root of the candidate word. This root can be obtained from the underivation (derivation reduction) module 7 of FIG. 16.

After action box 402, control proceeds to action box 404. Box 404 provides a logical FOR-LOOP for each derivational transform in the paradigm associated with the derivational root obtained at action box 402. After action box 404, control proceeds to decision box 406.

Boxes 406 and 408 illustrate optional prefixing control boxes. These control boxes are implemented if the user requests prefixing. Following action box 408 control proceeds to action box 410.

At action box 410, derivation expansion module 6 removes characters from the derivational root in accordance with the derivational transform associated with the paradigm currently being processed. After box 410, logical control passes to action box 412. At action box 412, a string of characters is added to the intermediate root formed in action box 410 in accordance with the current derivational transform. After box 412 control proceeds to box 414. At action box 414 a part-of-speech tag is assigned to the newly generated derivational expansion in accordance with the derivational transform. Following box 414, control proceeds to action box 420. Action box 420 ends the FOR-LOOP associated with action box 404, thereby ending the derivation expansion processing.

THE TOKENIZER

Figure 18:
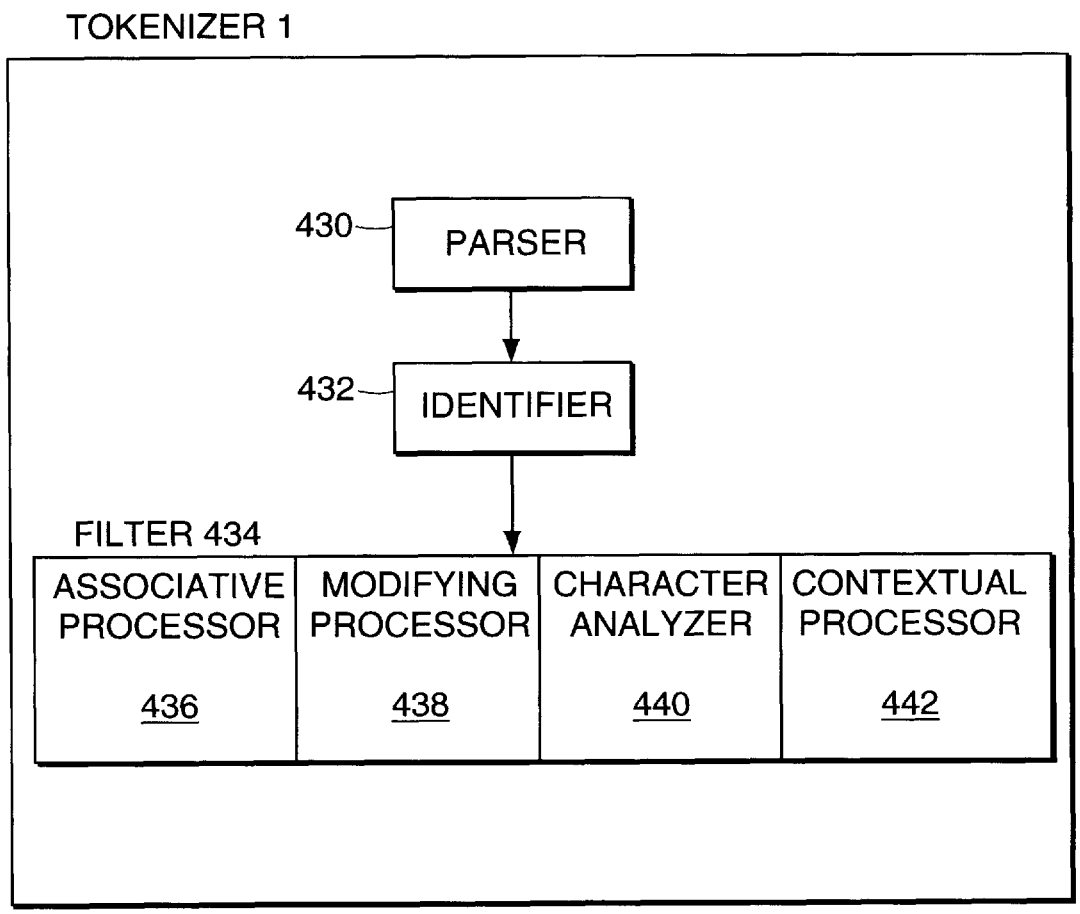
FIG. 18 is a detailed block diagram of the tokenizer shown in FIG. 1.

FIG. 18 illustrates a detailed drawing of the advanced tokenizer 1 for extracting lexical matter from the stream of text and for filtering the stream of text. Tokenizer 1 receives input either through the application program interface 11 or the input line 41, shown in FIG. 6, in the form of a text stream consisting of alternating lexical and non-lexical matter; accordingly, lexical tokens are separated by non-lexical matter. Lexical matter can be broadly defined as information that can be found in a lexicon or dictionary, and is relevant for Information Retrieval Processes. Tokenizer 1 identifies the lexical matter as a token, and assigns the attributes of the token into a bit map. The attributes of the non-lexical matter following the lexical token are mapped into another bit map and associated with the token. Tokenizer 1 also filters or identifies those tokens that are candidates for further linguistic processing. This filtering effect by the tokenizer reduces the amount of data processed and increases the overall system throughput.

Tokenizer 1 includes a parser 430, an identifier 432 electronically coupled with the parser 430, and a filter 434 electronically coupled with the identifier 432. The parser 430 parses the stream of natural language text and extracts lexical and non-lexical characters from the stream of text. The identifier 432 identifies a set of tokens in the parsed stream of text output by the parser 430. The identifier 432 identifies tokens as a consecutive string of lexical characters bounded by non-lexical characters in the stream of text. The filter 434 selects a candidate token from the tokens generated by the identifier 432. The candidate tokens selected by the filter 434 are suited for additional linguistic processing.

Typically, the Tokenizer 1 is the first module to process input text in the multilingual text processor 10. The output from the tokenizer 1 is used by other linguistic processing modules, such as the noun phrase analyzer 13 and the morphological analyzer 2. Input to the tokenizer 1 is in the form of a text stream form the application program interface 11. The parser 430 of the tokenizer 1 converts the input stream of text to lexical and non-lexical characters, after which the identifier 432 converts the lexical and non-lexical characters to tokens. The filter 434 tags those tokens requiring further linguistic processing. The tokens are converted back to stream format upon output to the application program interface 11. The filter can be implemented in either electronic hardware or software instructions executed by a multi-purpose computer. Flow charts and descriptions of the software sufficient to enable one skilled in the art to generate a filter 434 are described below.

The tokenizer can be implemented using conventional programming and numerical analysis techniques on a general purpose digital data processor. The tokenizer can be implemented on a data processor by writing computer instructions by hand that implement the tokenizer as detailed herein, or by forming a tokenizer as a finite state machine. Preferably, a finite state machine is used to implement the tokenizer. The finite state machine operates by recognizing one or more characters in the stream of text and entering a state in the machine based upon this recognition, and by performing operations on tokens within the stream of text based upon the current state of the machine. The code for the finite state machine must keep track of the current state of the machine, and have a way of changing from state to state based on the input stream of text. The tokenizer must also include a memory space for storing the data concerning the processed stream of natural language text.

In particular, for each token processed by the tokenizer 1, the filter 434 creates a tag to a memory location that stores a data structure including the parameters for the processed token. For instance, the data structure can include the following parameters:

| | |
|---|---|
| pInStream | Input: A pointer to the null-terminated input stream from which the tokenizer creates a token. The input stream might contain 8-bit or Unicode characters. |

| | |
|---|---|
| pMoreText | Input: A pointer to a flag that indicates if more text follows after the end of buffer is reached. This determines whether the tokenizer will process a partial token, or request more text before processing a partial token. |
| pCharsProcd | Output: The number of characters that the tokenizer processed on this call. This is the total number of characters that define the current token; this includes the length of the token and the non-lexical matter that follows it. The calling routine should increment the input buffer by this value to determine where to continue processing. |
| pHMCBuf | Output: A pointer to the output text buffer of the tokenizer. |
| pLexTokLen | Output: The total number of characters that define the current token; this includes only the length of the token and not the non-lexical matter that precedes or follows it. |
| pAttrib | Output: A 4-byte BitMap that contains the lexical and non-lexical attributes of the returned token. Preferably, the pAttribu parameters are stored in a 32-bit BitMap. |

This implementation of tokenizer 1 has several benefits. It achieves high throughput; it generates information about each token during a first pass across the input stream of text; it eliminates and reduces multiple scans per token; it does not require the accessing of a database; it is sensitive to changes in language; and it generates sufficient information to perform sophisticated linguistic processing on the stream of text. Moreover, tokenizer 1 allows the non-lexical matter following each token to be processed in one call. Additionally, tokenizer 1 achieves these goals while simultaneously storing the properties of the non-lexical string in less space than is required to store the actual string.

The filter 434 also includes a character analyzer 440 and a contextual analyzer 442 to aid in selecting a candidate token from the set of tokens generated by the identifying element 432. The filter selects a candidate token based upon an analysis of characters in the stream of text. The filter can either compare a particular character in the stream of text with entries in a character table, or the filter can analyze the particular character in the stream of text in view of the characters surrounding the particular characters in the stream of text.

For example, in one aspect the contextual analyzer 442 can select tokens for additional linguistic processing by analyzing those characters surrounding probable terminator characters, strippable punctuation characters, lexical punctuation characters, hyphen characters, apostrophe characters, parentheses characters, dot/period characters, slash characters, ellipse characters, and a series of hyphen characters.

The contextual analyzer in another aspect selects tokens for additional processing based on where the selected character is located relative to the suspect token. The character may be located in the "beginning", "middle", or "end" of the token. The term "Beginning" refers to a character that immediately precedes a lexical character, and the term "Middle" refers to a character occurring between two lexical characters, and the term "End" refers to a character immediately following a lexical character. In particular, in the case of strippable punctuation, the punctuation may be stripped from a token if it is found at the either the beginning or end of the token. If it occurs in the middle of a token, it does not cause the token to be split, and the punctuation is instead included within the token.

Furthermore, the location of the character relative to its position in the suspect token is applicable for analysis of probable terminator characters, lexical punctuation characters, hyphen characters, apostrophe characters, parentheses characters, dot/period characters, slash characters, ellipse characters, and a series of hyphen characters The contextual analyzer can also select tokens for additional processing based upon the existence of similarly related characters. In the case of parentheses, the existence of matching parentheses (i.e. left and right hand parentheses) within a particular token, as opposed to matching parentheses spanning two or more tokens, effects the linguistic processing performed on the particular token.

Further in accordance with the invention, the character analyzer 440 scans the stream of text for selected characters and identifies tokens having the selected characters as candidate tokens for additional linguistic processing. The character analyzer 440 utilizes a comparator and an associator for achieving this analysis. The comparator compares a selected character in the stream of text with entries in a character table. If the selected character and entry match, then additional linguistic processing is appropriate. After a successful match, the associator associates a tag with a token located proximal to the selected character, the tag identifying the appropriate additional linguistic processing.

One example of a table of characters used by the comparator includes characters selected from the group consisting of probable terminator characters, strippable punctuation characters, lexical punctuation characters, hyphen characters, apostrophe characters, parentheses characters, dot/period characters, slash characters, ellipse characters, or a series of hyphen characters.

In a further example of the filter 434, both the character analyzer 440 and the contextual processor 442 are used in selected tokens for additional linguistic processing. For instance, the filter 434 may use both the character analyzer 440 and the contextual processor 442 when filtering text that includes: (1.) apostrophes, (2.) parenthesis, (3.) dots/periods, (4.) slashes, (5.) ellipsis, and (6.) a series of hyphens.

(1.) Apostrophes

The character analyzer scans the stream of text for apostrophes because they can indicate pre-clitics, post-clitics, and contractions. The contextual analyzer determines whether the apostrophe causes a token to be appropriate for additional linguistic because if the apostrophe occurs at the beginning or end of a token, it is stripped off, and the appropriate flag is set. While if the apostrophe occurs between two lexical characters, it is included within the token, and the internal apostrophe flag is set.

(2.) Parenthesis

Parentheses are also analyzed by both the character analyzer and the contextual analyzer because parentheses behaves differently depending upon their relative location within the token and the relative location of matching parenthesis. The key rule is that if matching left and right parentheses are found within a lexical token, neither of the parentheses are stripped. For example, if the parenthesis character is located in the following positions relative to the token, the following actions occur:

| | |
|---|---|
| Beginning: | [(woman ◊<br>The left parenthesis is stripped.<br>The PreNoun Phrase Break flag is set.<br>The resultant token is: [(\|woman\| ◊<br>[(wo)man ◊<br>Both parentheses are ignored.<br>The Internal Parentheses flag is set.<br>The resultant token is: [(wo)man\| ◊<br>[(woman) ◊<br>Both parentheses are stripped.<br>The Pre Noun Phrase Break flag is set.<br>The Post Noun Phrase Break flag is set.<br>The resultant token is: [(\|woman\|) ◊ |

-continued

```
Middle:     [wo(man) ◊
            Both parentheses are ignored.
            The Internal Parentheses flag is set.
            The resultant token is: [wo(man)| ◊
            [wo(m)an ◊
            Both parentheses are ignored.
            The Internal Parentheses flag is set.
            The resultant token is: [wo(m)an| ◊
            [wo(man ◊
            The left parenthesis is ignored.
            No flags are set. The token is not split.
            The resultant token is: [wo(man| ◊
End:        [woman( ◊
            The left parenthesis is stripped.
            The Post Noun Phrase Break flag is set.
            The resultant token is: [woman|( ◊
            [woman() ◊
            Both parentheses are stripped.
            The Post Noun Phrase Break flag is set.
            The resultant token is: [woman|() ◊
Possible Flags Set:
    Internal Parentheses
    Pre Noun Phrase Break
    Post Noun Phrase Break
```

The right parenthesis behaves exactly like the mirror image of the left parenthesis. Again, the key rule is that if matching left and right parentheses are found within a lexical token, neither of the parentheses are stripped. In addition, an Internal Parentheses flag is set.

```
Beginning:  [)woman ◊
            The right parenthesis is stripped.
            The Pre Noun Phrase Break flag is set.
            The resultant token is: [)|woman| ◊
            [)(woman ◊
            Both paretheses are stripped.
            The Pre Noun Phrase Break flag is set.
            The resultant token is: [)(|woman| ◊
Middle:     [wo)man ◊
            The right parenthesis is ignored.
            No flags are set
            The resultant token is: [wo)man|( ◊
            [wo)m(an ◊
            Both parentheses are ignored.
            No flags are set.
            The resultant token is: [wo)m(an| ◊
            [wo)(man ◊
            Both parentheses are ignored.
            No flags are set.
            The resultant token is: [wo)(man| ◊
End:        [woman) ◊
            The right parenthesis is stripped.
            The Post Noun Phrase Break flag is set.
            The resultant token is: [woman|) ◊
            [woman)( ◊
            Both parentheses are stripped.
            The Post Noun Phrase Break flag is set.
            The resultant token is: [woman|)( ◊
Possible Flags Set:
    Pre Noun Phrase Break
    Post Noun Phrase Break
```

(3.) Periods

The Period can either indicate the end of a sentence, abbreviations, or numeric tokens, depending on the context. Accordingly, the period is analyzed by both the character and contextual analyzer of the filter 434.

(4.) Slash

The slash can be interpreted in one of two ways. Under most circumstances, it is used to separate two closely related words, such as male/female. In such cases, it is understood that the user is referring to a male or a female. However, the slash can also be used within a word to create a non-splittable word such as I/O. I/O cannot be split apart like male/female. The tokenizer preferably recognizes a slash character in the stream of text and performs a contextual analysis to determine how the slash character is being used, thereby identifying the appropriate additional linguistic processing.

(5.) Ellipsis

It is also beneficial to perform both contextual and character analysis on the Points of Ellipsis (POE). The POE is defined by either a series of three or four dots. Two dots and over four dots can be classified as non-Points of Ellipsis that are to be either stripped or ignored. While a valid POE at the end of a sentence may indicate sentence termination The behavior of the POE depends upon its relative position to the lexical token, as is demonstrated below.

```
Beginning:  [....abc ◊
            The POE is stripped.
            The Pre Noun Phrase Break flag is set.
            The resultant token is: [....|abc| ◊
Middle:     [abc....def ◊
            The POE is treated like an IIWSPC class character: The
            token is split.
            The Post Noun Phrase Break flag is set for the "abc" token.
            The resultant token is: [abc|....|def| ◊
End:        [abc.... ◊
            The POE is stripped.
            The Probable Termination flag is set.
            The Post Noun Phrase Break flag is set.
            The Stripped End of Word Period flag is not set.
            The resultant token is: [abc|.... ◊
```

The three dot POE is treated in the same manner as the four dot POE. However, variations such as two dots and five or more dots in series are treated as follows:

```
Beginning:  [..abc ◊
            Exactly the same as a valid leading POE.
Middle:     [abc..def ◊
            The dots are ignored: The token is not split.
            No flags are set.
            The resultant token is: [abc..def| ◊
End:        [abc.. ◊
            The dots are stripped.
            The Post Noun Phrase Break flag is set.
            The Stripped End of Word Period flag is not set.
            The resultant token is: |abc|.. ◊
```

Because any other than two hyphens in series can be either stripped or ignored, both contextual analysis and character analysis are appropriate in the case of a series of hyphens.

Further aspects of the invention provide for an associative processor 436 for associating with a selected candidate token a tag identifying additional linguistic processing, or for associating with a selected group of candidate tokens a plurality of tags identifying additional linguistic processing. The additional linguistic processing identified by a tag can include: pre noun phrase breaks, post noun phrase breaks, probable token termination, preclitic processing, post-clitic processing, apostrophe processing, hyphen processing, token verification, parentheses processing, unconvertible character processing, and capitalization processing. This list of advanced linguistic processing is intended as an example of additional processing and not as a limitation on the invention.

The filter 434 can also include a modifying processor 438. The modifying processor changes a selected token based on the tags identifying further linguistic processing for the selected token. The modifying processor includes subprocessors capable of either splitting tokens, stripping characters from tokens, ignoring particular characters, or merging tokens. The modifying processor 438 is capable of acting based upon flags potentially set during the process of selecting the token, as described above. The modifying processor 438 is also capable of acting based upon flags set in the parameters associated with a selected token. In particular, the modifying processor operates as a function of the attributes associated with each selected candidate token. The attributes associated with each token are identified by the pAttrib flag discussed above.

One sub-group of attributes identify the lexical attributes of the token. In particular, this sub-groups includes the internal character attribute, the special processing attribute, the end of sentence attribute, and the noun phrase attribute. Another sub-group of attributes identifies the non-lexical attributes of the token. The non-lexical attributes include: contains white space, single new line, and multiple new line.

The Internal Characters attributes signify the presence of a special character within a lexical token. The internal character attributes include: leading apostrophe, internal apostrophe, trailing apostrophe, leading hyphen, internal hyphen, trailing hyphen, internal slash, and internal parentheses.

The special processing attributes signals that the token must undergo special processing either inside or outside the tokenizer 1. These attributes include: numbers, possible pre-clitic, possible post-clitic, and unicode error.

The end of sentence and noun phrase attributes are used by both the Sentence Boundary Determiners and the Noun Phrase Analyzer. These attributes include: probable sentence termination, pre noun phrase break, post noun phrase break, attached end of word period, stripped end of word period, capitalization codes, and definite non sentence termination.

The above identified attributes are detailed below. The detailed descriptions of the attributes identify both the operations of the modifying processor 438 and the associating processor 436. In particular, the descriptions identify how the associating processor 436 identifies when a plurality of tokens becomes associated with a plurality of tags identifying additional linguistic processing. Furthermore, the descriptions below identify how the modifying processor modifies tokens in the stream of text as a function of the tag identified with a selected candidate token. Modifying functions described below include splitting tokens, stripping characters from tokens, ignoring characters within tokens, and merging tokens.

Leading Apostrophe (IILEADAPO)

The IILEADAPO bit is set only if:

1. An apostrophe immediately precedes a lexical character AND
2. The apostrophe does not occur between two lexical characters.

If these conditions are met:

1. The IILEADAPO flag is set.
2. The leading apostrophe is stripped. An exception occurs if an IIDIGIT class character immediately follows the apostrophe.

Examples:

| String | Actions | Flags Set | Token |
|---|---|---|---|
| ['twas◊ | Apostrophe stripped. | IILEADAPO | twas |
| ['sGravenschage◊ | Apostrophe stripped. | IILBADAPO | sGravenschage |
| [;'def◊ | Semi-colon stripped. Apostrophe stripped. | IILEADAPO | def |
| [abc'0'def◊ | Non-lexical characters ignored. Token not split. | None. | abc'+'def |
| ['def◊ | Both apostrophes stripped. | IILEADAPO | def |
| [-'def◊ | Hyphen stripped. Apostrophe stripped. | IILEADAPO | def |
| ['49ers◊ | Special because IIDIGIT immediately follows apostrophe. Apostrophe not stripped. Token not split. | IINUMBER | '49ers |
| ['94◊ | Special because IIDIGIT immediately follows apostrophe. Apostrophe not stripped. Token not split. | IINUMBER | '94 |

Internal Apostrophe (IINTAPO)

The IINTAPO bit is set if:

1. An apostrophe occurs between two lexical characters. If this condition is met:
1. The IINTAPO flag is set.

Examples:

| String | Actions | Flags Set | Token |
|---|---|---|---|
| [l'enfant◊ | Token not split. | IINTAPO | l'enfant |
| [d'aujour'hui◊ | Token not split. | IINTAPO | d'aujour'hui |
| [jack-o'-lantern◊ | Non-lexical characters ignored. Token not split. Internal Apostrophe flag not set. | None. | jack-o'-lantern |
| [Amy's◊ | Token not split. | IINTAPO | Amy's |
| [abc''def◊ | Non-lexical characters ignored. Token not split. Internal Apostrophe flag not set. | None. | abc''def |
| [abc'-'def◊ | Non-lexical characters ignored. Token not split. Internal Apostrophe flag not set. | None. | abc'-'def |
| [abc.'.def◊ | Non-lexical characters ignored. Token not split. Internal Apostrophe flag not set. | None. | abc.'.def |

Trailing Apostrophe (IITRLAPO)

The IITRLAPO flag is set only if:

1. An apostrophe immediately follows a lexical character AND
2. The character following the apostrophe is an IIWSPC class character or the apostrophe is the last character in the entire text stream. The end of the text stream is represented by either an INULL class character as defined by the OEM, or by the End of File character.

If these conditions are met:

1. The IITRLAPO flag is set.
2. The trailing apostrophe is stripped.

Examples:

| String | Actions | Flags Set | Token |
|---|---|---|---|
| [Jones' ◊ | Apostrophe stripped. | IITRLAPO | Jones |
| [Jones'; ◊ | Apostrophe stripped. Semi-colon stripped. | IITRLAPO | Jones |
| [Jones'' ◊ | Both apostrophes stripped. | IITRLAPO | Jones |
| [abc''def ◊ | Both apostrophes ignored. Token not split. | None. | abc''def |

Leading Hyphen (LH)
 The IILEADHYP bit is set only if:
  1. A hyphen immediately precedes a lexical character AND
  2. The hyphen does not occur between two lexical characters.
 If these conditions are met:
  1. The IILEADHYP flag is set.
  2. The leading hyphen is stripped.
Internal Hyphen (IINTHYP)
 The IINTHYP bit is set if one of the following two conditions occur:
  1. The hyphen is between two lexical characters.
  2. The hyphen immediately follows a valid form of an abbreviation, and is followed by a lexical character. The special case of "U.S.A.-based" is handled by this condition. Valid forms of abbreviations include "U.S.A." and "J.", but not "Jr."
 If these conditions are met:
  1. The IINTHYP flag is set.
  2. The token is not split. However, the presence/absence of an Em-Dash must be verified.
Trailing Hyphen (IITRLHYP)
 The IITRLHYP bit is set only if:
  1. The hyphen follows a lexical character AND
  2. The character following the hyphen is an IIWSPC class character or the trailing hyphen is the last character in the entire text stream. The end of the text stream is represented by either an IINULL class character as defined by the OEM, or by the End of File character.
 If these conditions are met:
  1. The IITRLHYP flag is set.
  2. The trailing hyphen is stripped.
Internal Slash (IINTSLASH)
 The IINTSLASH flag is set only if a slash occurs between 2 lexical characters.
Internal Parentheses (IINTPAREN)
 The IINTPAREN flag is set only if a LPAREN and a RPAREN occur in that order within a lexical token. In summary, two forms of a word can be indicated by using paired parentheses: i.e. (wo)man can be used to represent both man and woman. In one case, the text within the parentheses is disregarded, and in the second form, the text is included In order to simplify the processing for the Output Manager, only tokens that contain parentheses in this form are marked.
Digit Flag (IINUMBER)
 The IINUMBER flag is set any time an IIDIGIT class character occurs within a lexical token. Numbers may contain periods, commas, and hyphens as in the case of catalog part numbers. An external module will handle all tokens with the IINUMBER flag set: they may be indexed, or may be treated as non-indexable terms.
 Special attachment rules are used in the following two cases:

1. If a period is immediately followed by an IIDIGT, the period is left attached to the token. i.e. 0.75
  2. If an apostrophe is immediately followed by an IIDIGIT, the apostrophe is left attached to the token. i.e. '49ers
 In both cases, the period/apostrophe must be preceded by the beginning of the buffer or an IIWSPC character.
Possible Pre-Clitic (IIPRECLTC)
 The IIPRECLTC bit is set if:
  1. The language is French, Catalan, or Italian AND
  2. An apostrophe is found after a lexical character AND
  3. The number of characters preceding the apostrophe doesn't exceed the maximum pre-clitic length as defined in the language structure, AND
  4. The lexical character immediately preceding the apostrophe is found in a table of pre-clitic-terminating characters as defined in the language structure.
Possible Post-Clitic (IIPOSCLTC)
 The IIPOSCLTC bit is set if:
  I. The language is French, Catalan, or Portuguese AND
   1. A hyphen (or apostrophe for Catalan) is found AND
   2. The number of characters preceding the hyphen (apostrophe:Catalan) exceeds the minimum stem length as defined in the language structure, AND
   3. The character immediately following the hyphen (apostrophe:Catalan) is lexical AND
   4. It's found in a table of post-clitic initial characters as defined in the language structure.
  II. The language is Spanish or Italian AND
   1. The length of the token exceeds the minimum post-clitic length as defined in the language structure AND
   2. A right to left scan (L<=R) of the token matches a post-clitic in the table of post-clitics defined in the language structure. Note that exact implementation is temporary.
Unicode Error (IIUNICERR)
 Unconvertible Unicode characters are treated exactly like IIALPHA lexical characters. They do not cause a token to break: upon encountering such a character, the IIUNICERR flag must be set.
Probable Lexical Termination (IIPLTERM)
 If an IIPTERM or a point of ellipsis is encountered, this flag is set. It indicates to an external module to examine the token both preceding and following the current token. In particular, it indicates that the CapCode of the following token should be examined to see if the sentence has really terminated.
Pre Noun Phrase Break (IIPRENPBRK)
 The Pre Noun Phrase Break flag is set when the current token contains characters that guarantee that it cannot be combined with the previous token to form a noun phrase.
Post Noun Phrase Break (IIPOSNPBRK)
 The Post Noun Phrase Break flag is set when the current token contains characters that guarantee that it cannot be combined with the following token to form a noun phrase.
Attached End of Word Period (IIAEOWPER)
 This flag is set when the token is a valid abbreviation that ended in a period followed by IIWSPC. It cannot be determined if the abbreviation ends the sentence or not without examining the current token to see if it's a valid abbreviation, and the following token for its CapCode. In any case, the period is attached to the token.
Stripped End of Word Period (IISEOWPER)
 This flag is set when a period is found at the end of a token. The period is stripped, and the flag is set.

CapCodes

Two bits will be used to define the capCode as it exists.

Probable NonLexical Termination (IIPNLTERM)

If an IIPTERM or a point of ellipsis is encountered in the middle of non-lexical matter, this flag is set.

Contains White Space

Set when non-lexical matter contains characters of the IIWSPCS class.

Single Line Feed (SN)

The IISNLN bit is set only if a single NewLine 'character' occurs within the non-lexical matter following a token.

Figure 7A:
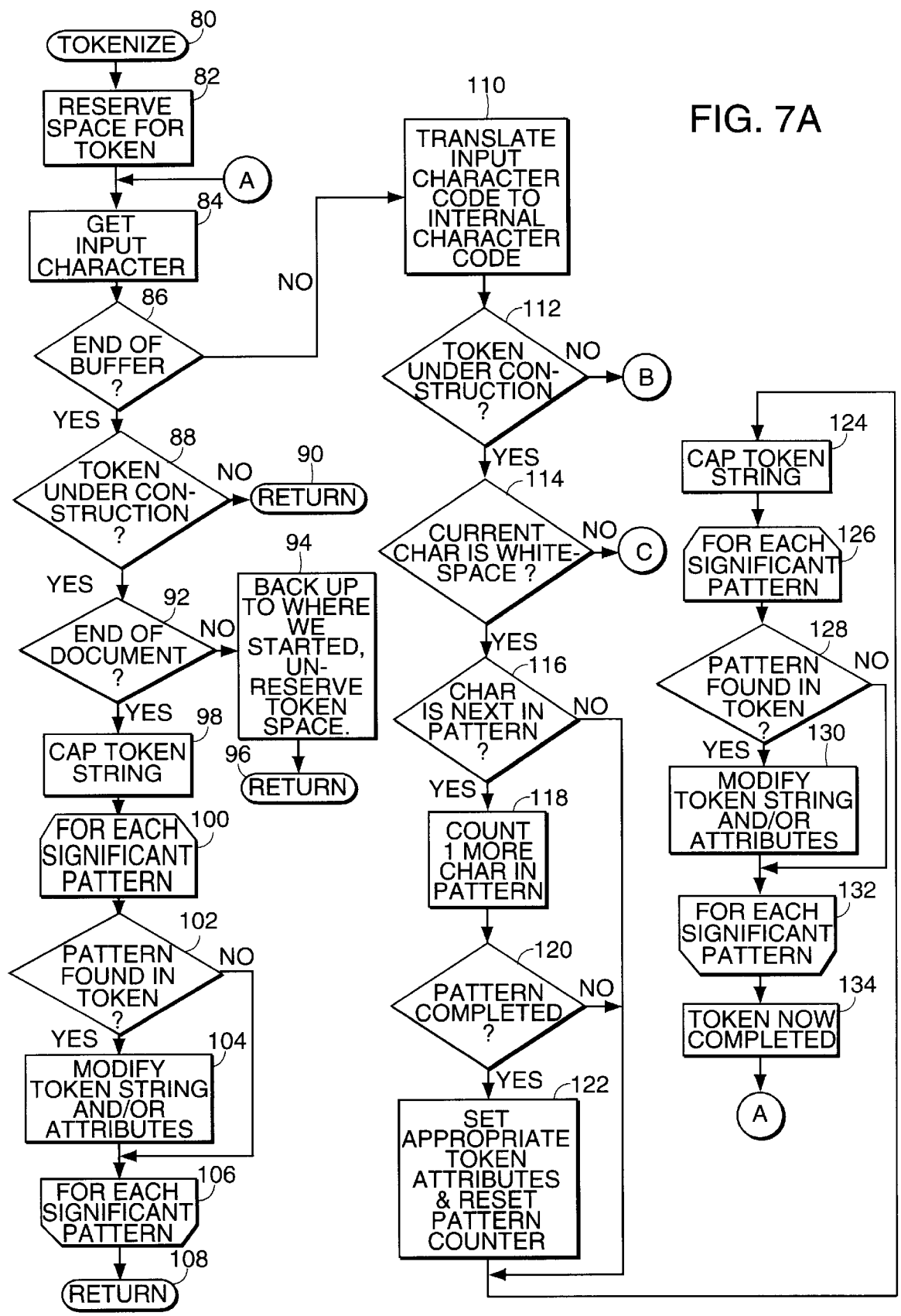
FIGS. 7A–7D show flow charts for the tokenizer illustrated in FIG. 1.
Figure 7B:
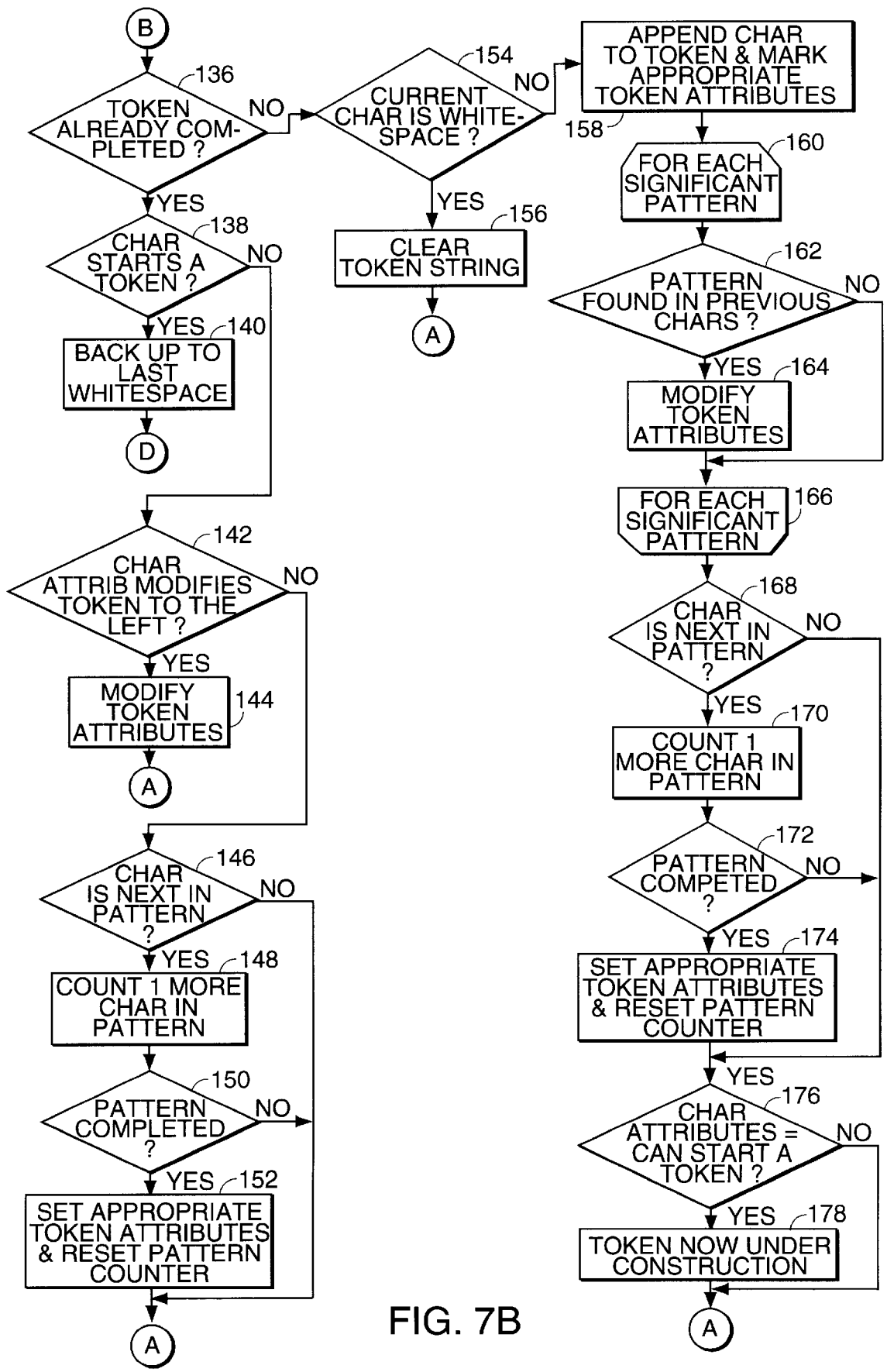
Figure 7C:
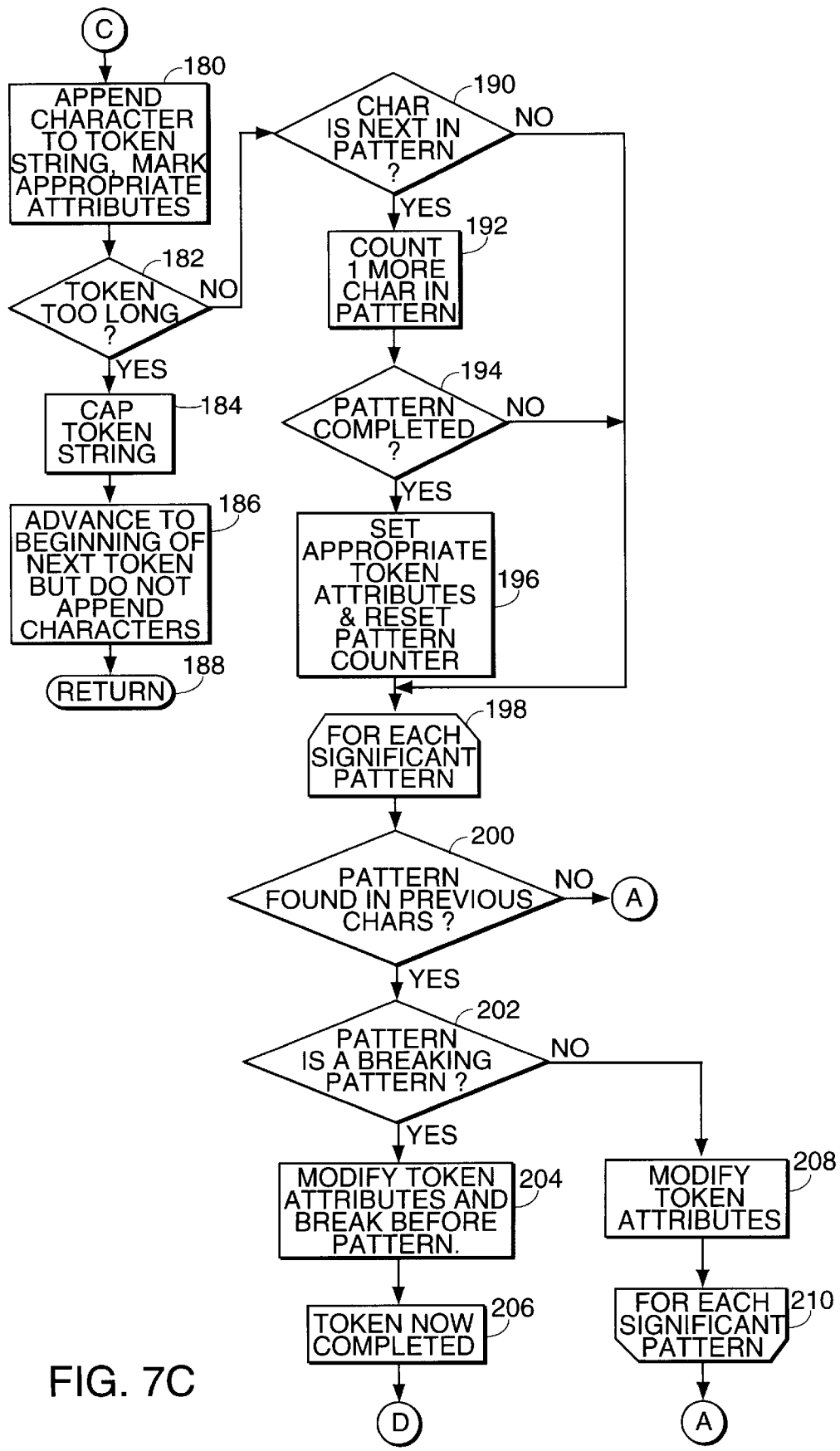
Figure 7D:
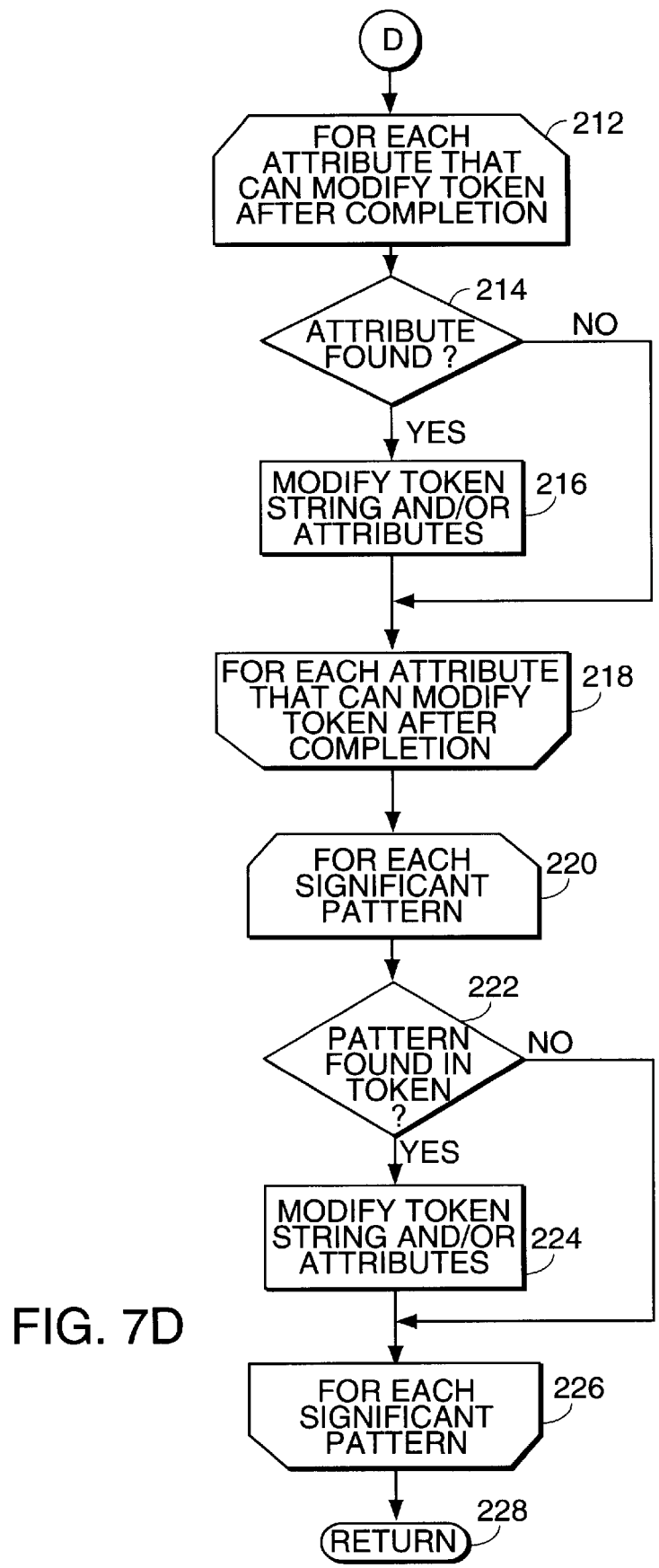

FIGS. 7A–7D are flow charts illustrating the operation of tokenizer 1. FIG. 7A generally illustrates the main trunk of the tokenization operation, FIG. 7B illustrates the token identification steps, FIG. 7C illustrates the token lengthening steps, and FIG. 7D illustrates the trailing attributes steps of the tokenization method according to the invention.

FIG. 7A shows steps 80–134 in the operation of the tokenizer 1. The operation of tokenizer 1 begins at step 80. After step 80, the operation proceeds to step 82.

At step 82, the tokenizer reserves space in memory 12 for the token. The reserved memory space will be used to hold a data structure that includes the parameters for the token being processed. These parameters, as discussed above, can include a pointer to the null-terminated input stream, a pointer to a flag indicating if more text follows, the number of characters processed by the tokenizer, a pointer to the output of the tokenizer, the total number of characters that define the current token, and a bitmap including the lexical and non-lexical attributes of the current token. After step 82, logical flow proceeds to step 84.

At step 84, the parser module 430 of tokenizer 1, gets an input character from the stream of natural language text. After which, at step 86, the tokenizer identifies whether the end of the text buffer is reached. If the end of buffer is reached, then logical flow proceeds to step 88. If the end of buffer is not reached, then logical flow branches to step 110.

When an end of buffer is identified in step 86, the tokenizer identifies whether a token is currently under construction, at step 88. If there is no token currently under construction, then control proceeds to step 90 and the tokenizer executes a return to the procedure calling the tokenizer. If a token is currently under construction at step 88, then the logical flow of the tokenizer proceeds to decision box 92.

At decision box 92, the tokenizer queries whether the end of the document has been reached. The tokenizer can identify the end of the document by scanning for particular codes in the stream of text than identify the end of the document. If the tokenizer is not at the end of the document, then control branches to action box 94, otherwise control proceeds to action box 98.

At action box 94, the tokenizer removes the space reserved for a token back in action box 82. After action box 94, the tokenizer proceeds to step 96 where the tokenizer executes a return instruction.

At action box 98, the tokenizer caps the token string and then executes a for-loop starting with box 100 and ending with box 106. The for-loop modifies attributes of the token or the token itself as a function of each significant pattern identified within the token. In particular, boxes 100 and 106 identify that the for-loop will execute once for every significant pattern. Decision box 102 queries whether a pattern is located in the token. If a pattern is found in the token, then control proceeds to action box 104. If a pattern is not found in the token, then control proceeds directly to action box 106. At action box 104, the tokenizer modifies the token and/or the token's attributes in accordance with patterns associated with the token. After box 106, the tokenizer executes a return instruction.

Steps 100–106 are executed by filtering element 434 of tokenizer 1. The filter 434 can further include sub-processors called the character analyzer 440, the contextual processor 442 and the modifying processor 438. The character analyzer 440 and the contextual processor 442 are closely related with steps 100 and 102. The modifying processor 438 is associated with step 104. In particular, the character analyzer and the contextual processor identify significant patterns formed by characters in the input stream of text. While, the modifying processor provides the tokenizer with the capability to modify the token and/or the token attributes as a function of significant patterns associated with the token currently being processed.

At step 110 the tokenizer translates the input character code identified in step 84 to an internal character code suitable for the tokenizer's use. After step 110, logical flow proceeds to step 112.

Steps 112–134 illustrate various steps for identifying tokens within the stream of text. In general, steps 112–134 include steps for determining those characters forming the beginning of a token, the end of a token, and the middle of a token. In particular, at step 112, if a token is not currently under construction control branches to step 136, in FIG. 7B. At step 112, if a token is currently under construction, then control proceeds to decision box 114.

At decision box 114, control branches to step 180 in FIG. 7C if the current character is not a whitespace. However, if the current character is a whitespace, then control proceeds to decision box 116.

At decision box 116, the tokenizer queries whether the current character being processed is next in a pattern. The tokenizer performs these operations by relying on the character analyzer 440 and the contextual processor 442. If the character is not in a pattern, then logical flow branches to action box 124. If the character is identified as part of a pattern, then flow proceeds to action box 118.

At action box 118, the tokenizer obtains an additional character. At decision box 120, the tokenizer queries whether the pattern is now completed. If the pattern is completed, then the tokenizer modifies the appropriate token attributes at action box 122. If the pattern is not completed, then flow proceeds to action box 124.

Steps 124–132 are equivalent to steps 98–106. For instance, at steps 124–132 the tokenizer identifies patterns in the stream of text and modifies tokens and token attributes in view of the identified patterns. After step 132, the token is identified as complete at step 134 and control returns to step 84.

FIG. 7B shows steps 136–178 in the operation of tokenizer 1. In particular, at decision box 136 the tokenizer queries whether the token is complete. If the token is complete, logical flow proceeds to decision box 138. If the token is not yet complete, then logical flow proceeds to decision box 154.

Steps 138–152 are performed within the confines of various token sub-processors. In particular, the modifying processor 438, the character analyzer 440, and the contextual processor 442 each play a part in performing steps 138–152. For instance, at decision box 138, the tokenizer and its character analyzer sub-processor query whether the current character starts a token. If the current character starts a token, then flow proceeds to action box 140. If the current character does not start a token ,then flow proceeds to decision box 142.

At action box 140, the tokenizer backs up to the last whitespace and then branches to step 212 of FIG. 7D.

At decision box 142, the tokenizer queries whether the attributes of the current character modify tokens to the left. If the character analyzer identifies that the current character modifies tokens to the left, then logical flow proceeds to step 144. At step 144, the modifying processor modifies the token attributes, and then the tokenizer branches back to step 84 of FIG. 7A. If the character analyzer, in step 142, identifies that the current character is not modifying tokens to the left, then logical flow branches to step 146.

Steps 146–152 are identical to steps 116–122 as shown in FIG. 7A. Following step 152, the tokenizer branches back to step 84 of FIG. 7A.

At step 154, in FIG. 7B, the tokenizer determines whether the current character is a whitespace. If the character is a whitespace, then control proceeds to step 156. At step 156, the token string is cleared and process returns to step 84 of FIG. 7A. If the character is not a whitespace, then control branches to step 158.

At step 158, another sub-processor of the tokenizer acts. In particular, at step 158 the identifier 432 appends the current character to the token being formed. The identifier thus acts throughout the tokenizer process described in FIGS. 7A–7D to identify tokens formed of lexical characters bounded by non-lexical characters. In addition, at step 158, the tokenizer marks the appropriate token attributes as a function of the character appended to the token. After step 158, control proceeds to step 160.

From step 160 through step 166, the tokenizer executes a for-loop starting with box 160 and ending with box 166. The for-loop modifies attributes of the token or the token itself as a function of each significant pattern identified within the token. In particular, boxes 160 and 166 identify that the for-loop will execute once for every significant pattern. Decision box 162 queries whether a pattern is found in the previous character. If a pattern is found in the previous character, then control proceeds to action box 164. If a pattern is not found in the token, then control proceeds directly to action box 166. At action box 164, the tokenizer modifies the token's attributes in accordance with patterns associated with the token.

Steps 160–166 are executed by sub-processors within the tokenizer called the character analyzer 440, the contextual processor 442 and the modifying processor 438. In particular, the character analyzer 440 and the contextual processor 442 are closely related with steps 160 and 162, while the modifying processor 438 is associated with step 164. After step 166, control proceeds to step 168.

Steps 168–174 are identical to steps 146–152 and proceed in the same manner. After step 174, control proceeds to decision box 176. At decision box 176, the tokenizer queries whether the current character can start a token. If the current character is not appropriate for starting a token then control returns to step 84 of FIG. 7A. If the current character can start a token, then at step 178 the current character is identified as the beginning of a token. After step 178, control returns to step 84 of FIG. 7A.

FIG. 7C shows steps 180–210 in the operation of tokenizer 1. At step 180, the tokenizer appends the current character to the token string being formed and updates the attributes associated with the token string in view of the newly appended character. After step 180, control proceeds to decision box 182.

At decision box 182, the tokenizer addresses whether the current token being formed is too long. If the token is too long, control proceeds to step 184 where the length of the token string is capped, and from there to steps 186 and 188 where the tokenizer advances to the beginning of the next token and executes a return instruction. If the token does not exceed a predetermined length, then control branches from decision box 182 to decision box 190.

Steps 190–196 are identical to steps 168–174 of FIG. 7B. For instance, steps 190–196 identify patterns formed by characters in the stream of text and update token attributes effected by the identified patterns. After step 196, logical control proceeds to step 198.

Step 198 begins a for-loop that is terminated by either step 206 or by step 210. The for-loop iteratively reviews the significant patterns in the token currently being formed until it is determined that either: the token is complete under step 206, or there are no additional significant patterns in the token under step 210. After step 198, logical flow proceeds to decision box 200.

At decision box 200, the tokenizer identifies whether a pattern was found in the character. If no pattern is found, then control jumps to step 84 of FIG. 1. If a pattern is found, then control proceeds to decision box 202.

At decision box 202, the tokenizer queries whether the pattern is a breaking pattern. If a breaking pattern is found then control branches to step 204. If no breaking pattern is found, then control first flows to action box 208 where the token attributes are modified in view of the pattern found, after which control flows to box 210 which continues the for-loop that started at step 198.

At action box 204, the token attributes are modified and the token is broken before the pattern identified in step 200. After step 204, the tokenizer flags the identified token as complete in step 206 and then branches to step 212 of FIG. 7D.

FIG. 7D shows steps 212–228 in the operation of tokenizer 1. Steps 212–218 execute a for-loop that executes until all attributes in the token that can modify the token have been processed. In particular, the for-loop begins at step 212 and then proceeds to step 214. At steps 214 and 216 the tokenizer modifies the token in accordance with the attribute currently being processed. At step 218 the tokenizer completes its processing on the current attribute and branches back to step 212 if additional attributes remain, otherwise control flows to step 220.

At step 220 another for-loop that ends with step 226 begins executing. This for-loop is identical to the for-loop of steps 100–106, of FIG. 7A. After completing execution of the for-loop of steps 220–226, the tokenizer executes a return instruction at step 228.

While the invention has been shown and described having reference to specific preferred embodiments, those skilled in the art will understand that variations in form and detail may be made without departing from the spirit and scope of the invention. Having described the invention, what is claimed as new and secured by letters patent is:

1. A computerized tokenizer for identifying a token formed of a string of lexical characters found in a stream of digitized natural language text, the computerized tokenizer comprising:

parsing means for extracting lexical and non-lexical characters from the stream of digitized text, identifying means coupled with said parsing means for identifying a set of tokens, each token being formed of a string of parsed lexical characters bounded by non-lexical characters, and filtering means coupled with said identifying means for selecting a candidate token from said set of tokens, said candidate token being suitable for linguistic processing beyond the identification of tokens.

2. A tokenizer according to claim 1, wherein said filtering means further comprises an associative processing element for associating with said candidate token a tag identifying additional linguistic processing for said candidate token.

3. A tokenizer according to claim 2, wherein said associative processing element further includes a group processing element for associating with a plurality of tokens, as a function of said candidate token, a plurality of tags identifying additional linguistic processing for said plurality of tokens.

4. A tokenizer according to claim 2, further comprising a modifying processor for modifying said candidate token as a function of said tag associated with said candidate token.

5. A tokenizer according to claim 4, wherein said modifying processor includes splitting means for splitting said candidate token into multiple tokens.

6. A tokenizer according to claim 4, wherein said modifying processor includes stripping means for stripping a character from said candidate token.

7. A tokenizer according to claim 4, w herein said modifying processor includes ignoring means for ignoring a non-lexical character surrounding said candidate token.

8. A tokenizer according to claim 4, wherein said modifying processor includes merging means for merging said candidate token with another token in the stream of text.

9. A tokenizer according to claim 1, wherein said filtering selects said candidate token from said set of tokens during a single scan of the parsed stream of text.

10. A tokenizer according to claim 1, wherein said filtering means further comprises a character analyzer for selecting said candidate token from said set of tokens, said character analyzer including comparing means for comparing a selected character in the parsed stream of text with entries in a character table, and associating means for associating a first tag with a first token located proximal to said selected character, when said selected character has an equivalent entry in the character table.

11. A tokenizer according to claim 10, comprising lexical processing means for comparing a selected lexical character with entries in the character table and for associating said first tag with a token including said selected lexical character, when said selected lexical character has an equivalent entry in the character table.

12. A tokenizer according to claim 10, comprising non-lexical processing means for comparing a selected non-lexical character with entries in the character table and for associating said first tag with a token preceding said selected non-lexical character, when said selected non-lexical character has an equivalent entry in the character table.

13. A tokenizer according to claim 10, wherein said character table includes entries representative of a plurality of languages such that said tokenizer operates in the plurality of languages.

14. A tokenizer according to claim 13, wherein the plurality of languages is selected from the group consisting of English, French, Catalan, Spanish, Italian, Portuguese, German, Danish, Norwegian, Swedish, Dutch, Finish, Russian, and Czech.

15. A tokenizer according to claim 1, wherein said filtering means further comprises a contextual processor for selecting said candidate token from said set of tokens as a function of a contextual analysis of the lexical and non-lexical characters surrounding a selected character in the parsed stream of text.

16. A tokenizer according to claim 15, wherein said contextual processor includes a set of rules applicable in a plurality of languages such that said tokenizer operates in the plurality of languages.

17. A tokenizer according to claim 16, wherein the plurality of languages is selected from the group consisting of English, French, Catalan, Spanish, Italian, Portuguese, German, Danish, Norwegian, Swedish, Dutch, Finish, Russian, and Czech.

18. A tokenizer according to claim 1, further comprising a memory element for storing and retrieving the digitized stream of natural language text and for storing and retrieving a data structure that includes parameters for each token.

19. A tokenizer according to claim 18, wherein said parameters include an input stream flag identifying the location of a digitized stream of natural language text in said memory element.

20. A tokenizer according to claim 18, wherein said parameters include a flag identifying the number of lexical characters and non-lexical characters forming a token.

21. A tokenizer according to claim 18, wherein said parameters include an output flag identifying the location of an output signal generated by said tokenizer.

22. A tokenizer according to claim 18, wherein said parameters include a flag identifying the number of lexical characters forming a token.

23. A tokenizer according to claim 18, wherein said parameters include the lexical and non-lexical attributes of a token.

24. A tokenizer according to claim 23, wherein said non-lexical attributes are selected from the group consisting of: contains white space, single new line, and multiple new line.

25. A computerized data processing method for identifying a token formed of a string of lexical characters found in a stream of digitized natural language text, said method comprising the steps of extracting lexical and non-lexical characters from the stream of text, identifying a set of tokens, each token being formed of a string of extracted lexical characters bounded by extracted non-lexical characters, and using a filter to select a candidate token from said set of tokens, said candidate token being suitable for linguistic processing beyond the identification of tokens.

26. A computerized data processing method according to claim 25, wherein said extracting step further comprises the step of ignoring stoplist characters in the stream of text.

27. A computerized data processing method according to claim 25, wherein said identifying step further comprises the step of identifying a beginning of a first token as a function of the attributes associated with the first token.

28. A computerized data processing method according to claim 25, wherein said identifying step further comprises the step of identifying an end of a first token as a function of a pattern formed by a plurality of characters in the stream of digitized text.

29. A computerized data processing method according to claim 25, wherein said candidate token is selected from said set of tokens during a single scan of the parsed stream of text.

30. A computerized data processing method according to claim 25, wherein said selecting step further comprises the steps of comparing a selected character in the parsed stream of text with entries in a character table, and associating a first tag with a first token located proximal to said selected character, when said selected character has an equivalent entry in the character table.

31. A computerized data processing method according to claim 30, further comprising the steps of
comparing a selected lexical character with entries in the character table, and
associating said first tag with a token including said selected lexical character, when said selected lexical character has an equivalent entry in the character table.

32. A computerized data processing method according to claim 30, further comprising the steps of
comparing a selected non-lexical character with entries in the character table, and
associating said first tag with a token preceding said selected non-lexical character, when said selected non-lexical character has an equivalent entry in the character table.

33. A computerized data processing method according to claim 30, further comprising the step of forming a character table having entries representative of a plurality of languages.

34. A computerized data processing method according to claim 25, further comprising the steps of selecting said candidate token from said set of tokens as a function of a contextual analysis of the lexical and non-lexical characters surrounding a selected character in the parsed stream of text.

35. A computerized data processing method according to claim 25, further comprising the step of associating with said candidate token a tag identifying additional linguistic processing for said candidate token.

36. A computerized data processing method according to claim 35, further comprising the step of associating with a plurality of tokens, as a function of said candidate token, a plurality of tags identifying additional linguistic processing for said plurality of tokens.

37. A computerized data processing method according to claim 35, further comprising the step of modifying said candidate token as a function of said tag associated with said candidate token.

38. A computerized data processing method according to claim 37, further comprising the step of splitting said candidate token into multiple tokens.

39. A computerized data processing method according to claim 37, further comprising the step of stripping a character from said candidate token.

40. A computerized data processing method according to claim 37, further comprising the step of ignoring a non-lexical character surrounding said candidate token.

41. A computerized data processing method according to claim 37, further comprising the step of merging said candidate token with another token in the stream of text.

42. A computerized data processing method according to claim 35, further comprising the steps of
storing in a first location of a memory element attributes of said candidate token, said attributes identifying the additional linguistic processing suitable for said candidate token, and
causing the tag to point to the first location.

43. A computerized data processing method according to claim 42, further comprising the step of storing in the first location attributes selected from the group consisting of lexical attributes and non-lexical attributes.

44. A computerized data processing method according to claim 43, further comprising the step of selecting the non-lexical attributes from the group consisting of: contains white space, single new line, and multiple new line.

45. A computerized tokenizer for identifying a token formed of a string of lexical characters found in a stream of digitized natural language text, the computerized tokenizer comprising:
parsing means for extracting lexical and non-lexical characters from the stream of digitized text,
identifying means coupled with said parsing means for identifying a set of tokens, each token being formed of a string of parsed lexical characters bounded by non-lexical characters,
filtering means coupled with said identifying means for selecting a candidate token from said set of tokens, said candidate token being suitable for additional linguistic processing, and
a memory element for storing and retrieving the digitized stream of natural language text and for storing and retrieving a data structure that includes parameters for each token,
wherein said parameters include the lexical and non-lexical attributes of a token,
wherein said lexical attributes are selected from the group consisting of internal character attributes, special processing attributes, end of sentence attributes, and noun phrase attributes.

46. A tokenizer according to claim 45, wherein said internal character attributes are selected from the group consisting of leading apostrophe, internal apostrophe, trailing apostrophe, leading hyphen, internal hyphen, trailing hyphen, internal slash, and internal parentheses.

47. A tokenizer according to claim 45, wherein said special processing attributes are selected from the group consisting of number flags, possible pre-clitic, possible post-clitic, and unicode error.

48. A tokenizer according to claim 45, wherein said end of sentence attributes are selected from the group consisting of probable sentence termination, attached end of word period, stripped end of word period, capcode high, capcode low, and definite non sentence termination.

49. A tokenizer according to claim 45, wherein said noun phrase attributes are selected from the group consisting of probable sentence termination, attached end of word period, stripped end of word period, capcode high, capcode low, definite non sentence termination, pre noun phrase break, and post noun phrase break.

50. A computerized data processing method for identifying a token formed of a string of lexical characters found in a stream of digitized natural language text, said method comprising the steps of:
extracting lexical and non-lexical characters from the stream of text,
identifying a set of tokens, each token being formed of a string of extracted lexical characters bounded by extracted non-lexical characters,
selecting a candidate token from said set of tokens, said candidate token being suitable for additional linguistic processing,
associating with said candidate token a tag identifying additional linguistic processing for said candidate token,
storing in a first location of a memory element attributes of said candidate token, said attributes identifying the additional linguistic processing suitable for said candidate token,
causing the tag to point to the first location, and
selecting the lexical attributes from the group consisting of internal character attributes, special processing attributes, end of sentence attributes, and noun phrase attributes.

* * * * *

UNITED STATES PATENT AND TRADEMARK OFFICE
CERTIFICATE OF CORRECTION

PATENT NO. : 5,890,103
DATED : March 30, 1999
INVENTOR(S) : Alwin B. Carus

It is certified that error appears in the above-identified patent and that said Letters Patent is hereby corrected as shown below:

Title page, item [73], change Assignee's address in Belgium to the town of : "Ieper" instead of "Ypres".

Signed and Sealed this

Fifth Day of October, 1999

Attest:

Q. TODD DICKINSON

*Attesting Officer*  *Acting Commissioner of Patents and Trademarks*